(12) United States Patent
Tan

(10) Patent No.: US 7,084,340 B2
(45) Date of Patent: Aug. 1, 2006

(54) APPARATUS AND METHOD OF LETTER LEARNING FINGER PATTERNS FOR STRINGED INSTRUMENTS

(75) Inventor: Shulan Tan, Madison, WI (US)

(73) Assignee: Muse Method, Madison, WI (US)

( * ) Notice: Subject to any disclaimer, the term of this patent is extended or adjusted under 35 U.S.C. 154(b) by 786 days.

(21) Appl. No.: 09/804,878

(22) Filed: Mar. 13, 2001

(65) Prior Publication Data

US 2002/0096036 A1 Jul. 25, 2002

Related U.S. Application Data

(60) Provisional application No. 60/200,214, filed on Apr. 28, 2000.

(51) Int. Cl.
*G09B 15/02* (2006.01)

(52) U.S. Cl. .................................. 84/477 R
(58) Field of Classification Search .............. 84/470 R, 84/471 R, 473, 474, 471, 477, 479, 483.1
See application file for complete search history.

(56) References Cited

U.S. PATENT DOCUMENTS

| | | | |
|---|---|---|---|
| 1,300,193 A | | 4/1919 | Raff |
| 1,509,320 A | | 9/1924 | Schneider |
| 1,556,147 A | | 10/1925 | Johnson et al. |
| 1,821,516 A | | 9/1931 | Hohn |
| 1,991,864 A | | 2/1935 | Nopola et al. |
| 2,001,191 A | | 5/1935 | Golden |
| 2,820,391 A | | 1/1958 | Janssen et al. |
| 2,824,479 A | | 2/1958 | De Rosa |
| 3,218,904 A | | 11/1965 | Hartman |
| 3,752,031 A | * | 8/1973 | Mohos .................. 84/471 R |
| 3,758,698 A | | 9/1973 | Matyas |
| 3,769,872 A | * | 11/1973 | Andrews ............... 84/470 R |
| 3,771,409 A | | 11/1973 | Rickey |
| 3,785,240 A | | 1/1974 | Hill |
| 3,894,465 A | | 7/1975 | Simmons |
| 4,175,468 A | * | 11/1979 | Whitlock ............... 84/485 SR |
| 4,417,497 A | | 11/1983 | Nicklaus |
| 4,503,748 A | | 3/1985 | Barber, Jr. |
| 4,559,861 A | | 12/1985 | Patty et al. |
| 4,620,471 A | | 11/1986 | Dunn |
| 4,885,969 A | * | 12/1989 | Chesters ................ 84/423 A |
| 4,969,383 A | | 11/1990 | Bezeau, Jr. |
| 5,029,507 A | | 7/1991 | Bezeau, Jr. |
| 5,320,020 A | * | 6/1994 | Corley .................... 84/474 |
| 5,410,940 A | | 5/1995 | Havas |
| 5,458,040 A | | 10/1995 | Lawrence et al. |
| 5,594,191 A | | 1/1997 | Epstein et al. |
| 5,644,096 A | | 7/1997 | Bull |
| 5,709,552 A | * | 1/1998 | LeGrange ............... 434/404 |
| 5,866,832 A | | 2/1999 | Solowiow |
| 5,920,023 A | | 7/1999 | Ravagni et al. |
| 5,945,618 A | | 8/1999 | Bennett |
| 6,218,603 B1 | * | 4/2001 | Coonce ................... 84/470 R |
| 6,288,315 B1 | * | 9/2001 | Bennett .................. 84/470 R |

OTHER PUBLICATIONS

"Beginner's plucks" Wisconsin State Journal, May 23, 2000, 1pg.

"Don't Fret Note MapTM," http://www.dontfret.com/ web page, May 23, 2000, 2pgs.

Gerle, Robert, The Art of Practising the Violin, 1983, 29pgs, Stainer & Bell Ltd.

* cited by examiner

*Primary Examiner*—Kimberly Lockett
(74) *Attorney, Agent, or Firm*—McGuireWoods LLP

(57) ABSTRACT

A tool for learning positions of notes on a fingerboard of a stringed instrument having a baseboard and templates for placement over the baseboard so as to focus a student's attention on finger patterns that are necessary to master a stringed instrument. Additional embodiments include color-coded templates and finger pattern codons that correspond to finger patterns used to play notes on various stringed instruments.

9 Claims, 21 Drawing Sheets

| G String | D String | A String | E String |
|---|---|---|---|
| Ab (G#) | Eb (D#) | Bb (A#) | F |
| A | E | B(Cb) | F# (Gb) |
| Bb (A#) | F | C | G |
| B(Cb) | F# (Gb) | C# (Db) | G# (Ab) |
| C | G | D | A |
| C# (Db) | G# (Ab) | D# (Eb) | A# (Bb) |
| D | A | E | B(Cb) |
| Eb (D#) | Bb (A#) | F | C |
| E | B(Cb) | F# (Gb) | C# (Db) |
| F | C | G | D |
| F# (Gb) | C# (Db) | G# (Ab) | D# (Eb) |
| G | D | A | E |
| Ab (G#) | Eb (D#) | Bb (A#) | F |
| A | E | B(Cb) | F# (Gb) |
| Bb (A#) | F | C | G |
| B(Cb) | F# (Gb) | C# (Db) | G# (Ab) |
| C | G | D | A |
| C# (Db) | G# (Ab) | D# (Eb) | A# (Bb) |

FIG. 5

| C String | G String | D String | A String |
|---|---|---|---|
| C# (Db) | Ab (G#) | Eb (D#) | Bb (A#) |
| D | A | E | B(Cb) |
| Eb (D#) | Bb (A#) | F | C |
| E | B(Cb) | F# (Gb) | C# (Db) |
| F | C | G | D |
| F# (Gb) | C# (Db) | G# (Ab) | D# (Eb) |
| G | D | A | E |
| Ab (G#) | Eb (D#) | Bb (A#) | F |
| A | E | B(Cb) | F# (Gb) |
| Bb (A#) | F | C | G |
| B(Cb) | F# (Gb) | C# (Db) | G# (Ab) |
| C | G | D | A |
| C# (Db) | G# (Ab) | D# (Eb) | A# (Bb) |
| D | A | E | B(Cb) |
| Eb (D#) | Bb (A#) | F | C |
| E | B(Cb) | F# (Gb) | C# (Db) |
| F | C | G | D |
| F# (Gb) | C# (Db) | G# (Ab) | D# (Eb) |

FIG. 5A

| E String | A String | D String | G String | B String | E String |
|---|---|---|---|---|---|
| F | A#(Bb) | D#(Eb) | G#(Ab) | C | F |
| F#(Gb) | B(Cb) | E | A | C#(Db) | F#(Gb) |
| G | C | F | A#(Bb) | D | G |
| G#(Ab) | C#(Db) | F#(Gb) | B(Cb) | D#(Eb) | G#(Ab) |
| A | D | G | C | E | A |
| A#(Bb) | D#(Eb) | G#(Ab) | C#(Db) | F | A#(Bb) |
| B(Cb) | E | A | D | F#(Gb) | B(Cb) |
| C | F | A#(Bb) | D#(Eb) | G | C |
| C#(Db) | F#(Gb) | B(Cb) | E | G#(Ab) | C#(Db) |
| D | G | C | F | A | D |
| D#(Eb) | G#(Ab) | C#(Db) | F#(Gb) | A#(Bb) | D#(Eb) |
| E | A | D | G | B(Cb) | E |
| F | A#(Bb) | D#(Eb) | G#(Ab) | C | F |
| F#(Gb) | B(Cb) | E | A | C#(Db) | F#(Gb) |
| G | C | F | A#(Bb) | D | G |
| G#(Ab) | C#(Db) | F#(Gb) | B(Cb) | D#(Eb) | G#(Ab) |
| A | D | G | C | E | A |
| A#(Bb) | D#(Eb) | G#(Ab) | C#(Db) | F | A#(Bb) |
| B(Cb) | E | A | D | F#(Gb) | B(Cb) |
| C | F | A#(Bb) | D#(Eb) | G | C |
| C#(Db) | F#(Gb) | B(Cb) | E | G#(Ab) | C#(Db) |

FIG. 5B

APPARATUS AND METHOD OF LETTER LEARNING FINGER PATTERNS FOR STRINGED INSTRUMENTS

This application is a continuation-in-part of Provisional Application No. 60/200,214 filed Apr. 28, 2000, the disclosure of which is incorporated by reference herein.

FIELD AND BACKGROUND OF THE INVENTION

For a violinist, notes in a given key must be chosen by placing certain left-hand fingers on various strings for every hand position, for a total of 24 keys. (It may be counted as only 12 keys since major and minor are relative and share the same key signature). Understandably, at a beginner or intermediate skill level, one can hardly play music of more than four or five sharps or flats, or at higher registers because of the multitude of finger patterns in different positions and keys.

Through the years, various methods for left-hand finger patterns have been taught (Baillot, Flesch, Gerle etc.,). Yet, most stop short of exploring beyond one string level and a few simple keys, let alone constructing systematic finger patterns in relation to key and position. In other words, there is a lack of an overall picture of four-string-finger-patterns in the study of positions in all keys. The present invention is directed to a left-hand-finger-pattern study that teaches a thorough knowledge in this field. Most examples discussed herein are directed specifically to the study of violin, but the methods apply equally well to other stringed instruments such as viola, cello, bass, mandolin, and guitar.

SUMMARY OF THE INVENTION

The present invention is directed to an improved tool for teaching finger patterns on a stringed instrument. In one embodiment of the present invention there is provided an apparatus for displaying finger patterns of a stringed instrument, the apparatus including: a baseboard having thereon a pattern of chromatic notes, each note positioned in the same relative position as it appears on the fingerboard of the stringed instrument; and a plurality of templates for placement over the baseboard, each template corresponding to at least one particular key in a particular position and defining a plurality of holes through which notes corresponding to the particular key are visible. The templates can be releasably secured to the baseboard to represent twelve different major keys in more than seven different positions, including use of all the templates being simultaneously and releasably secured to the baseboard. The templates are preferably color-coded and even more preferably color-coded in a pre-determined pattern, such as in the spectrum of a rainbow.

The apparatus may further include: a base having thereon a plurality of color-coded bars extending radially outward from a center of the base, each bar corresponds to a finger pattern of the stringed instrument and the arrangement of the bars corresponds to the cyclic nature of finger patterns on the finger board of the stringed instrument; and a plurality of key signatures with positions adjacent to each bar. Each bar can correspond to a finger pattern codon. The finger pattern codon can be a combination of four letters taken from a set of a seven-letter-code, and corresponding to a finger pattern to be used to play notes for twelve major keys in their corresponding positions, such as the seven letters: h, m, l, O, H, M, and L, wherein: h represents a half step in a tetrachord—the $3^{rd}$ and $4^{th}$ degrees of notes in a major diatonic scale, and played closely together by the third and fourth fingers; m represents a half step in a tetrachord—the $3^{rd}$ and $4^{th}$ degrees of notes in a major scale, and played closely together by the second and third fingers; 1 represents a half step in a tetrachord—the $3^{rd}$ and $4^{th}$ degrees of notes in a major scale, and played closely together by the first and second fingers; O represents all four fingers spaced apart and played in whole steps—the $4^{th}$, $5^{th}$, $6^{th}$, and $7^{th}$ tetrachord; H represents a half step in a tetrachord—the $7^{th}$ and upper tonic notes in a major scale, and played closely together by the third and fourth fingers; M represents a half step in a tetrachord—the $7^{th}$ and upper tonic notes in a major scale, and played closely together by the second and third fingers; and L represents a half step in a tetrachord—the $7^{th}$ and upper tonic notes in a major scale, and played closely together by the first and second fingers.

Another apparatus for displaying finger patterns of a stringed instrument in accordance with the present invention includes: a scale board in a Movable-Do System having thereon a pattern of numbers, each number corresponding to a degree of a note for a given diatonic major scale and positioned in the same relative position as the degree of the note appears on the finger board of the stringed instrument; and a ladder frame for placement on the scale board in a plurality of positions, the ladder frame defining a plurality of windows to expose the scale board numbers. It can also be a transparent overlay for positioning over the scale board, the transparent overlay having thereon a pattern of numbers, each number corresponding to a certain degree of a note for a given diatonic major scale and positioned in the same relative position as the degree of the note appears on the finger board of the stringed instrument.

The scale board numbers can represent the first, third, fourth, and seventh degree of a diatonic major scale, and the transparent overlay numbers can represent the second, fifth, and sixth degree of the diatonic major scale.

The ladder frame can be releasably secured to the scale board, and can define seven lateral windows.

BRIEF DESCRIPTION OF THE DRAWINGS

FIG. 5 is a combined fingerboard chart for a violin (in the treble clef), in accordance with the present invention;

FIG. 5A is a combined fingerboard chart for a viola (in the alto clef) or a cello (in the bass clef), in accordance with the present invention;

FIG. 5B is a combined fingerboard chart for a guitar (in the treble clef), in accordance with the present invention;

DETAILED DESCRIPTION OF THE INVENTION

Figure 1:
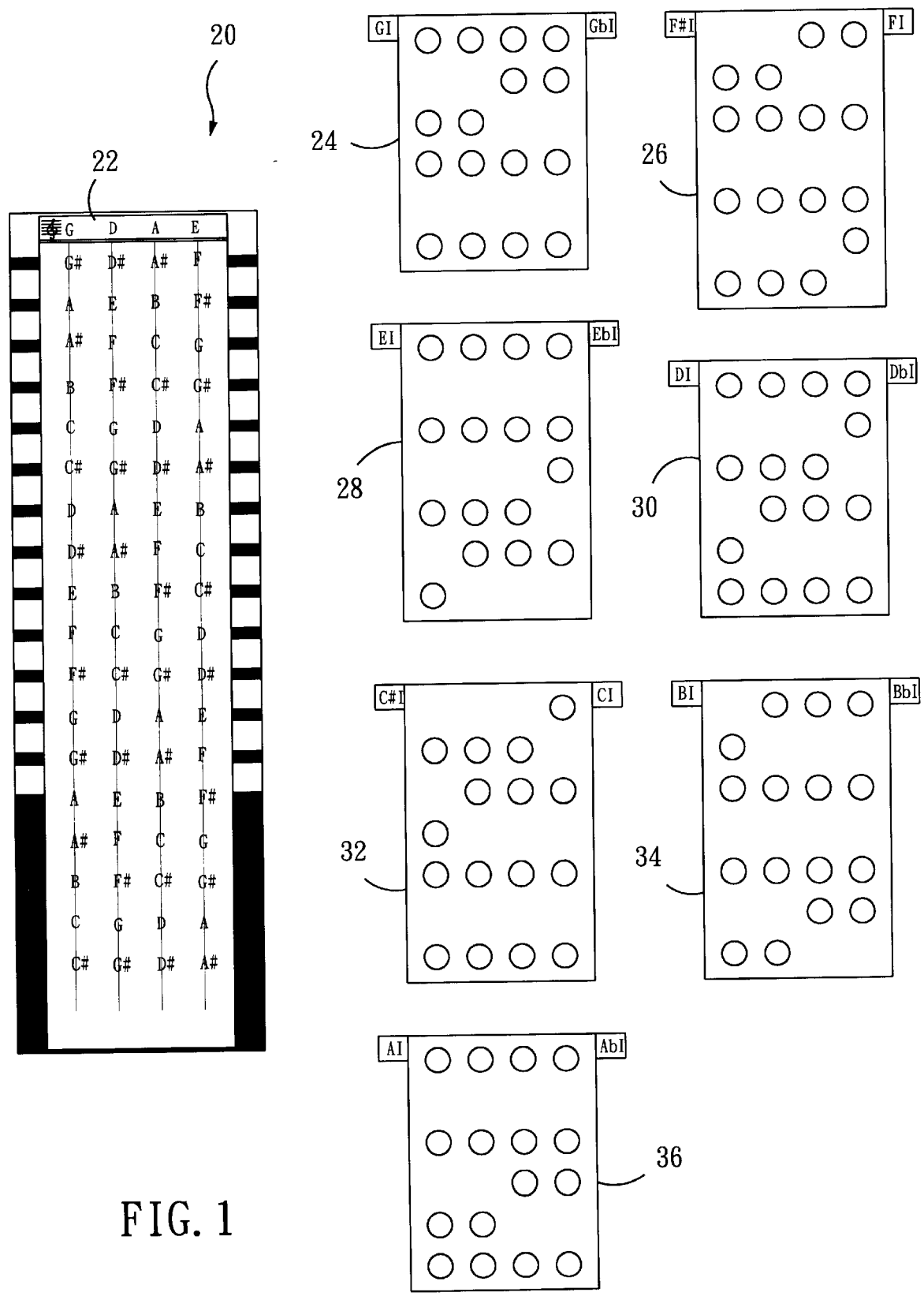
FIG. 1 is a fingerboard chart for a violin with seven finger pattern templates in accordance with the present invention.
Figure 2A:
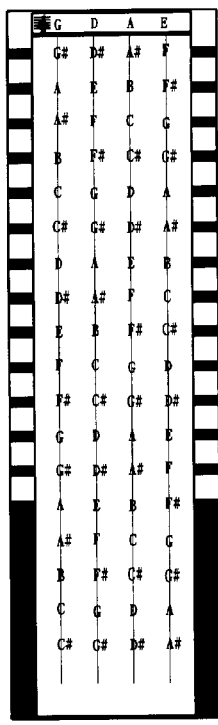
FIGS. 2A through 2H are the fingerboard charts of FIG. 1 with the seven finger pattern templates being sequentially added in FIGS. 2B through 2H to show all notes in G major.
Figure 2B:
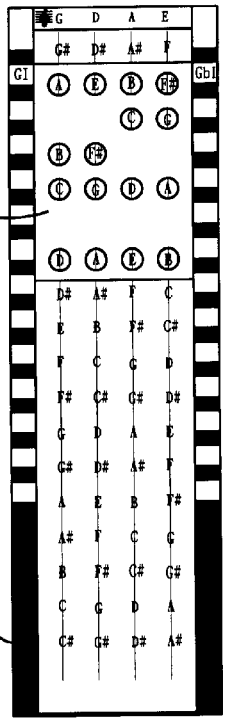
Figure 2C:
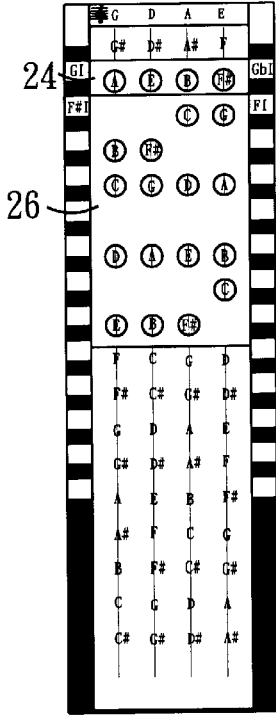
Figure 2D:
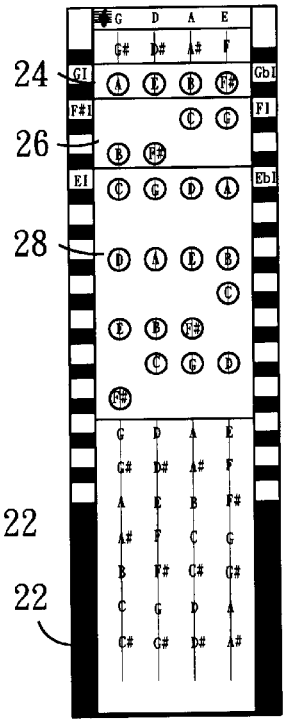
Figure 2E:
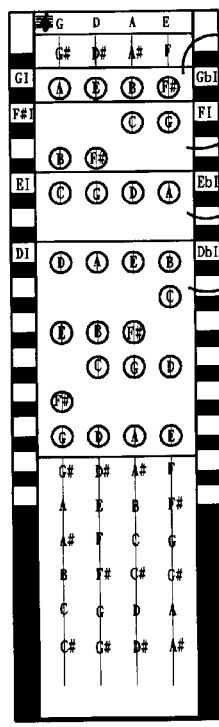
Figure 2F:
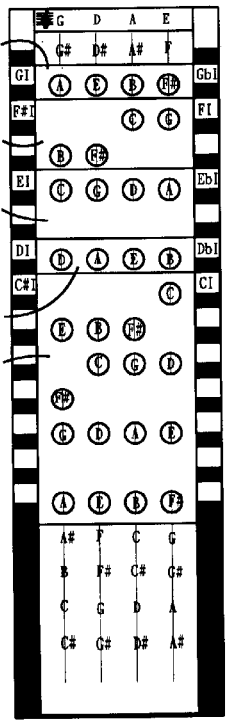
Figure 2G:
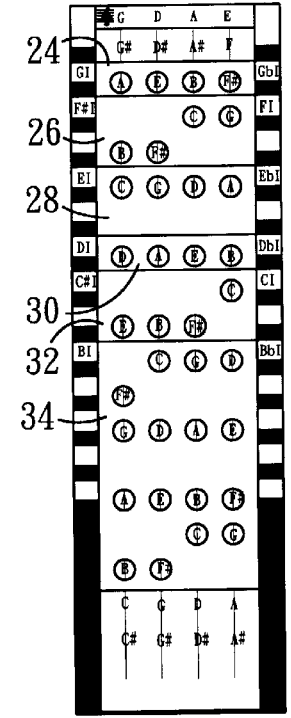
Figure 2H:
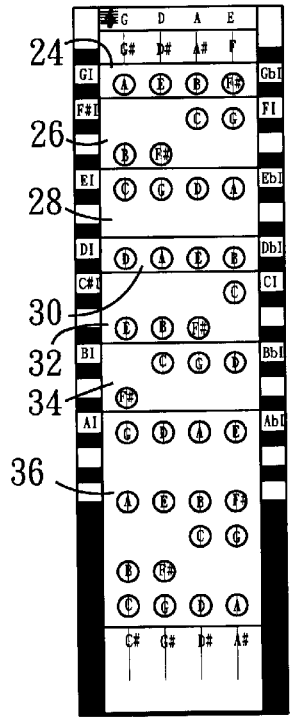
Figure 3:
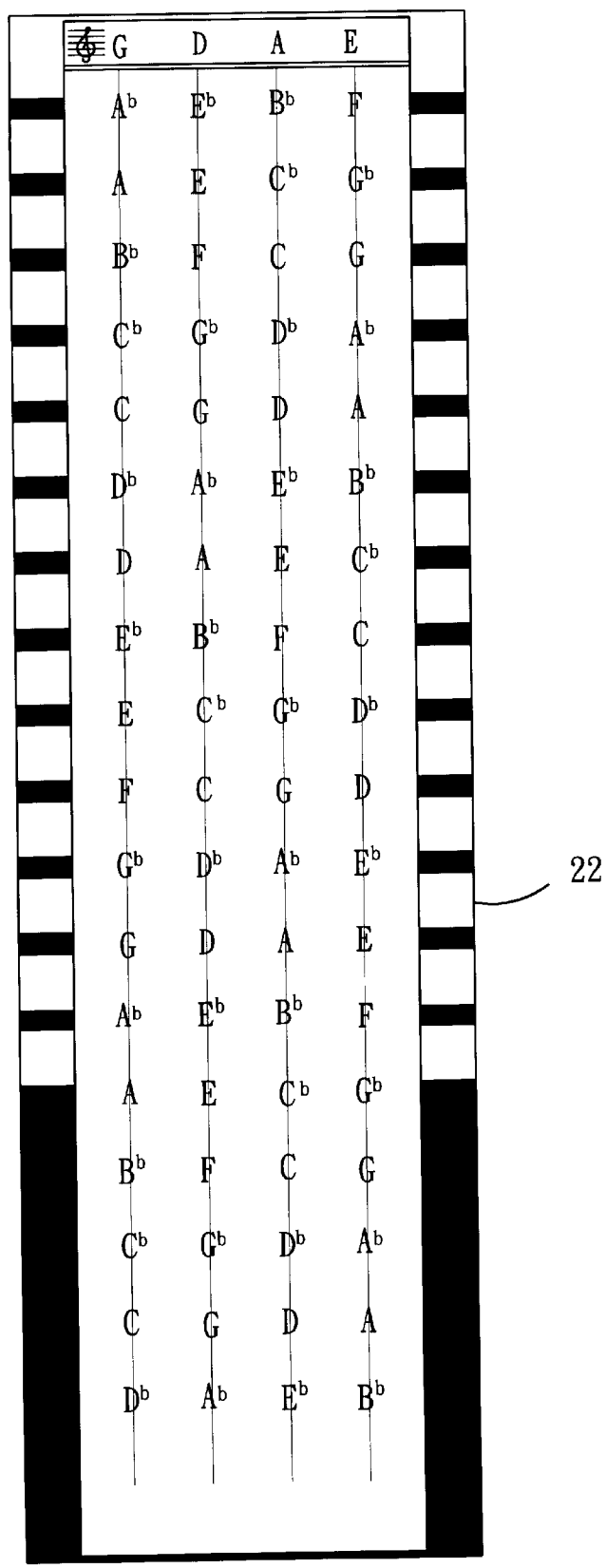
FIG. 3 is an additional fingerboard chart showing flats in place of the sharps of FIG. 1.
Figure 4:
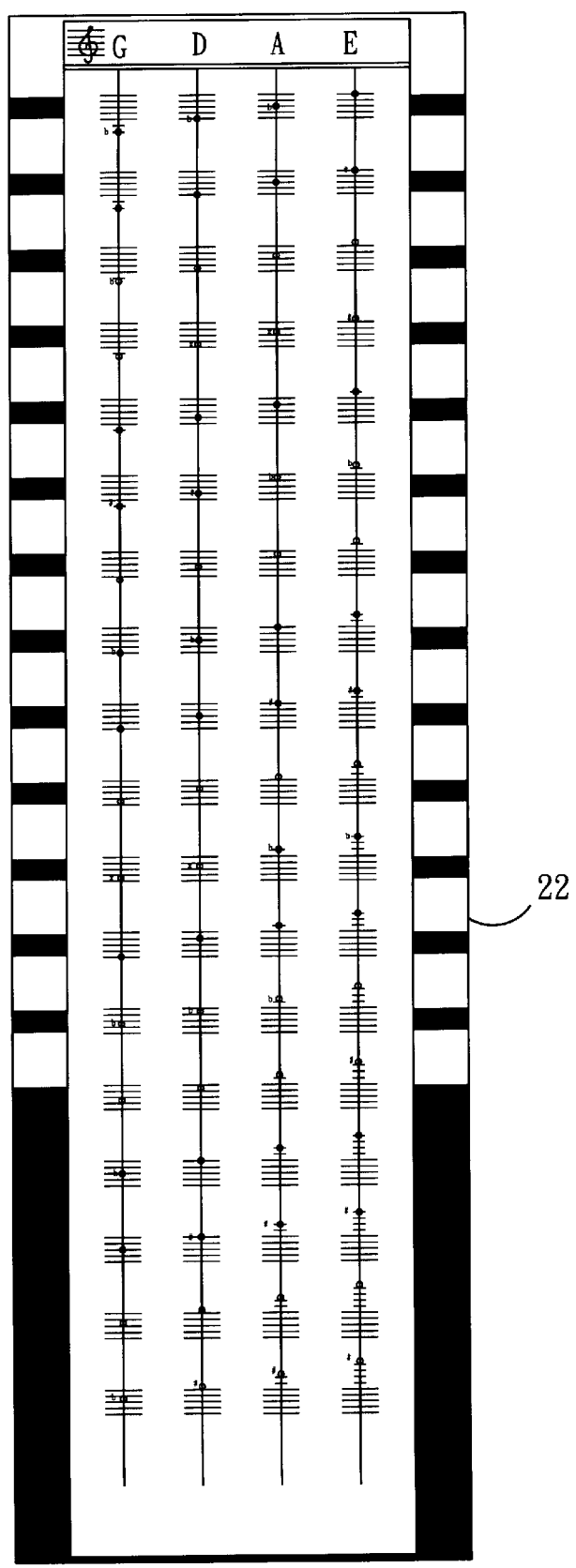
FIG. 4 is an alternate fingerboard chart in accordance with the present invention.
Figure 6:
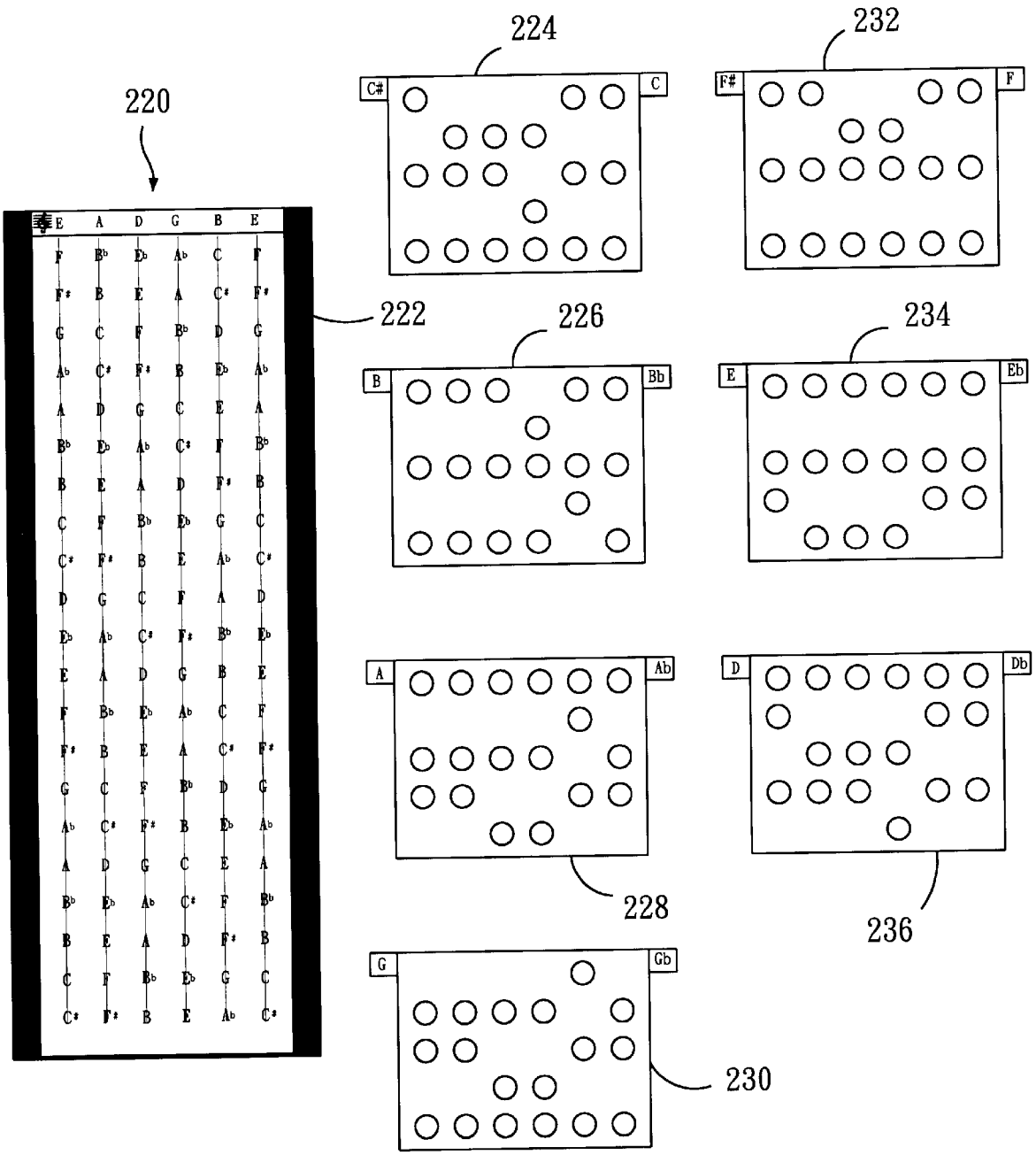
FIG. 6 is a fingerboard chart for a six-stringed guitar with seven finger pattern templates, in accordance with the present invention.
Figure 7A:
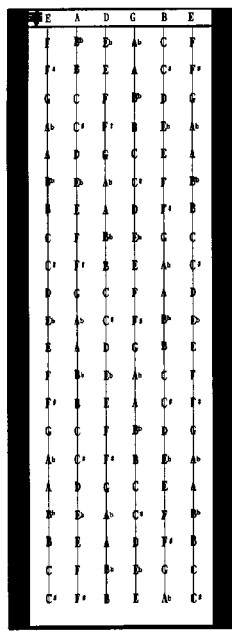
FIGS. 7A through 7H are the fingerboard charts of FIG. 6 with the seven finger pattern templates being sequentially added in FIGS. 7B through 7H to show all notes in C major.
Figure 7B:
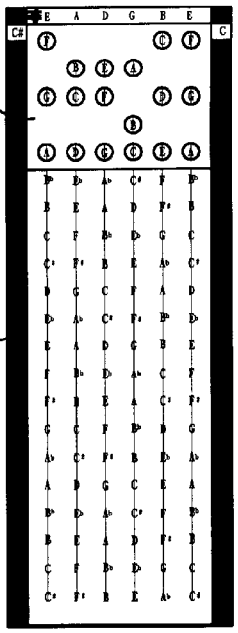
Figure 7C:
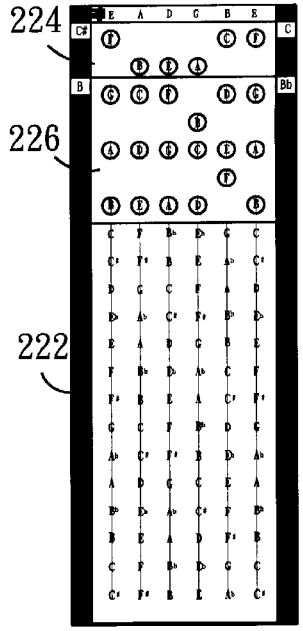
Figure 7D:
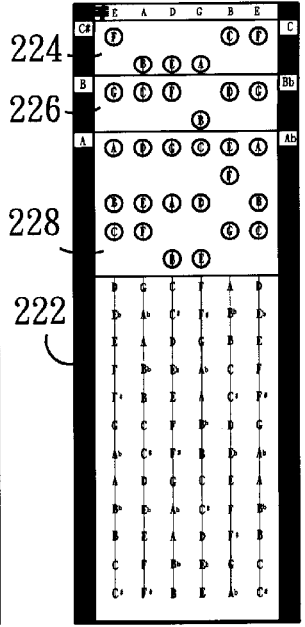
Figure 7E:
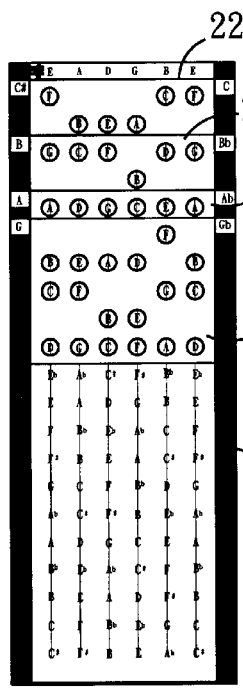
Figure 7F:
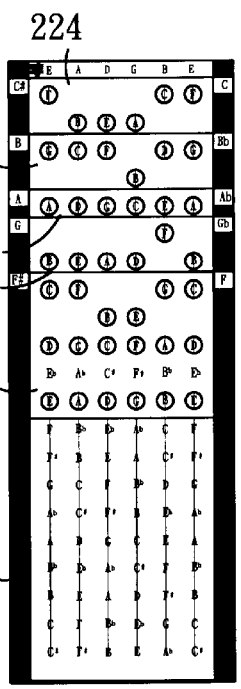
Figure 7G:
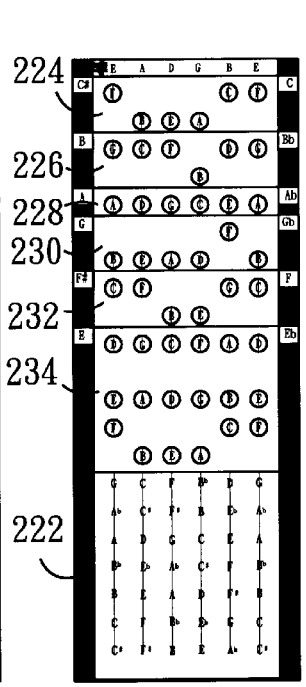
Figure 7H:
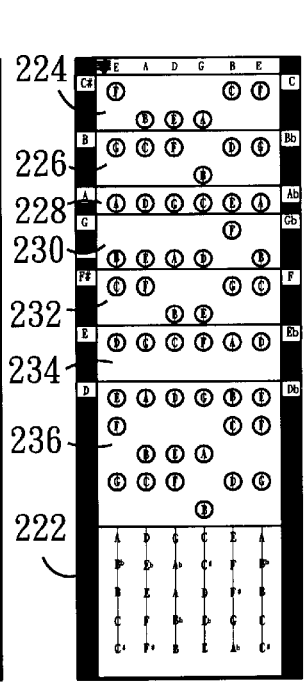

In accordance with the present invention, there is provided a tool 20 that simulates a fingerboard 22 of a four-stringed instrument—violin, and includes templates 24, 26, 28, 30, 32, 34, and 36 for identifying finger patterns for various keys in various positions. The tool 20 helps a student visualize necessary finger patterns for a given key and teaches an understanding of the repetitiousness of finger patterns as different keys are played. The tool 20 can be made by hand or it can be mass-produced. Further, the tool 20 can be a simple board 22 with templates 24 to 36, as described below; it can be an electronic board with lighted finger patterns, or it can be installed as software on a computer to show finger patterns while coincidentally playing the sound of the notes. This latter version adds considerably to the teaching value of the present invention. It is also possible to mount an electronic version of the present invention in a stringed instrument for ease of use.

The tool 20 can be made of any suitable materials, including metal, paper-based products, plastic, backlit transparencies, etc.

A simple handmade version of the tool 20 can be made as follows.

Materials

1) A piece of Styrofoam cardboard about 4.5"×15"
2) Seven pieces of rainbow color cardboard about 3"×5" each
3) Tracing paper Construction 1) Construct Baseboard On a piece of 4.5"×15" board 22, draw four vertical parallel lines in equal distance which represent, from left to right, G, D, A, and E strings in violin. Fill up a total of 72 chromatic notes with equal space on these four lines, such that each line has 18 notes. These notes are taken from the violin fingerboard (FIG. 5) as though they were to be played on the cardboard but not in exact proportion as when played on the violin. Please note that when the baseboard is constructed it is a rectangular shape although the shape of a violin fingerboard is tapered towards the scroll. The charts used in the text herein are not proportioned like an actual fingerboard.

2) Construct G Major Scale First Position—G I 24

Use tracing paper to cover only the area of first position (from $1^{st}$ to $4^{th}$ finger) on the baseboard 22, include all four strings. Select and circle 16 notes contained in G major scale in the first position.

3) Construct G Major Scale Second Position—G II 26

Use the same method described in step 2), but choose 16 notes of G major scale from the second position instead.

4) Construct G Major Scale $3^{rd}$, $4^{th}$, $5^{th}$, $6^{th}$, and $7^{th}$ Positions _G III 28, G IV 30, G V 32, G VI 34, and G VII 36

Use the same method described in step 3); choose sets of 16 notes corresponding to position III, IV, V, VI, and VII, respectively.

5) Color Coding

Transfer all seven prototypes to seven pieces of color papers in such a way that red matches G I 24, orange—G II 26, yellow—G III 28, green—G IV 30, blue—G V 32, indigo—G VI 34, and violet—G VII 36. Punch out all circled notes; thus form seven colored finger-pattern templates.

6) Letter Coding

Define the letter codes:

h as half step (the $3^{rd}$ and $4^{th}$ degrees of note in a major scale) to be played by the $3^{rd}$ and $4^{th}$ fingers, the rests are whole steps in a tetrachord.

m as half step (the $3^{rd}$ and $4^{th}$ degrees of note in a major scale) to be played by the $2^{nd}$ and $3^{rd}$ fingers, the rests are whole steps in a tetrachord.

l as half step (the $3^{rd}$ and $4^{th}$ degrees of note in a major scale) to be played by the $1^{st}$ and $2^{nd}$ fingers, the rests are whole steps in a tetrachord.

O as all four fingers are spread out with whole steps (degrees of note $4^{th}$, $5^{th}$, $6^{th}$, and $7^{th}$ in a major scale) in between in a tetrachord.

H as half step (the $7^{th}$ and upper tonic notes in a major scale) to be played by the $3^{rd}$ and $4^{th}$ fingers, the rests are whole steps in a tetrachord.

M as half step (the $7^{th}$ and upper tonic notes in a major scale) to be played by the $2^{nd}$ and $3^{rd}$ fingers, the rests are whole steps in a tetrachord.

L as half step (the $7^{th}$ and upper tonic notes in a major scale) to be played by the $1^{st}$ and $2^{nd}$ fingers, the rests are whole steps in a tetrachord.

7) Build the Position Codons

Use letter codes h, m, l, O, H, M, and L onto each template, literally translates all seven G major templates string by string into seven four-letter-code-words, i.e., seven template codons. For example: GI 24 red template is translated into codon mMlL, which means, for G major scale, in $1^{st}$ position,

| G | string is fingered as | 1 | 2&3 | 4 | and coded as | m |
| D | string is fingered as | 1 | 2&3 | 4 | and coded as | M |
| A | string is fingered as | 1&2 | 3 | 4 | and coded as | l |
| E | string is fingered as | 1&2 | 3 | 4 | and coded as | L |

Thus, we get a grand G major scale letter codons from $1^{st}$ to $7^{th}$ positions as follows:

TABLE 1

Finger Pattern Codons for Grand G Major Scale in Violin

| MAJOR KEY/POSITION | FINGER PATTERN LETTER CODON | COLOR CODING |
|---|---|---|
| G I | mMlL | Red |
| G II | lLOh | Orange |
| G III | OhHm | Yellow |

TABLE 1-continued

Finger Pattern Codons for Grand G Major Scale in Violin

| MAJOR KEY/POSITION | FINGER PATTERN LETTER CODON | COLOR CODING |
|---|---|---|
| G IV | HmMl | Green |
| G V | MlLO | Blue |
| G VI | LOhH | Indigo |
| G VII | hHmM | Violet |

Using the Fingerboard Tool

1) To Display Finger Patterns of G Major Scale in Seven Positions

Arrange all seven templates 24 to 36 on the baseboard 22, from top to bottom, in the sequence of red, orange, yellow, green, blue, indigo, and violet. This can be done using magnets to hold the templates in place or other constructions such as recesses that hold the templates in place while the tool 20 is in use. To display G major scale for entire seven positions, start from the second row, overlap each other such that two adjacent templates are one or half step apart. We then get a grand picture of G major on four strings, which shows all the notes in every position from $1^{st}$ to $7^{th}$. These seven templates, whether individually viewed or grouped together in a rainbow sequence, are the basis of the present invention.

2) To Display Finger Patterns of $1^{st}$ Position for Every Major and Natural Minor Key From Table 1, through careful observations, one can expand it into Table 2 and Table 3, and discover a whole new avenue of interest.

TABLE 2

First Position Finger Pattern Codons For Twelve Major Keys In Violin

| MAJOR KEY/ POSITION | FINGER PATTERN CONDON/COLOR | | MAJOR KEY/POSITION |
|---|---|---|---|
| G I | mMlL | Red | G I |
| | | | *Gb I (half position lower than G I) |
| G II | lLOh | Orange | *F# I |
| | | | F I (half position lower than F# I) |
| G III | OhHm | Yellow | E I |
| | | | Eb I (half position lower than E I) |
| G IV | HmMl | Green | D I |
| | | | *Db I (half position lower than D I) |
| G V | MlLO | Blue | *C# I |
| | | | C I (half position lower than C# I) |
| G VI | LOhH | Indigo | *B I |
| | | | Bb I (half position lower than B I) |
| G VII | hHmM | Violet | A I |
| | | | Ab I (half position lower than A I) |

* Enharmonic Keys:
  F# major (6 sharps)=Gb major (6 flats)
  C# major (7 sharps)=Db major (5 flats)
  B major (5 sharps)=Cb major (7 flats)

Table 2 shows that:

Gb I shares the same finger pattern, mMlL, as G I

F# I and F I share the same finger pattern, lLOh, as G II

E I and Eb I share the same finger pattern, OhHm, as G III

D I and Db I share the same finger pattern, HmMl, as G IV

C# I and C I share the same finger pattern, MlLO, as G V

B I and Bb I share the same finger pattern, LOhH, as G VI

A I and Ab I share the same finger pattern, hHmM, as G VII

TABLE 3

First Position Finger Pattern Codons for Twelve Natural Minor Keys in Violin

| NATURAL MINOR KEY/POSITION | FINGER PATTERN CODON/COLOR | | NATURAL MINOR KEY/POSITION |
|---|---|---|---|
| E I | mMlL | Red | E I |
| | | | *Eb I (half position lower than E I) |
| E II | lLOh | Orange | *D# I |
| | | | D I (half position lower than D# I) |
| E III | OhHm | Yellow | C# I |
| | | | C I (half position lower than C# I) |
| E IV | HmMl | Green | B I |
| | | | *Bb I (half position lower than B I) |
| E V | MlLO | Blue | *A# I |
| | | | A I (half position lower than A# I) |
| E VI | LOhH | Indigo | *G# I |
| | | | G I (half position lower than G# I) |
| E VII | hHmM | Violet | F# I |
| | | | F I (half position lower than F# I) |

* Enharmonic Keys:
  D# minor (6 sharps)=Eb minor (6 flats)
  A# minor (7 sharps)=Bb minor (5 flats)
  G# minor (5 sharps)=Ab minor (7 flats)

Table 3 shows that:

Eb I minor shares the same finger pattern, mMlL, as E I

D# I and D I minors share the same finger pattern, lLOh, as E II

C# I and C I minors share the same finger pattern, OhHm, as E III

B I and Bb I minors share the same finger pattern, HmMl, as E IV

A# I and A I share the same finger pattern, MlLO, as E V

G# I and G I minors share the same finger pattern, LOhH, as E VI

F# I and F I minors share the same finger pattern, hHmM, as E VII

3) To Display Finger Patterns of All Positions for Every Major and Natural Minor Key:

From Table 2, one can easily draw out Table 4:

TABLE 4

Finger Pattern Codons of Twelve Major Keys in All Positions for Violin

| MAJOR KEY /POSITION | G, Gb | F#, F | E, Eb | D, Db | C#, C | B, Bb | A, Ab |
|---|---|---|---|---|---|---|---|
| I, VIII | mMlL (red) | lLOh (orange) | OhHm (yellow) | HmMl (green) | MlLO (blue) | LOhH (indigo) | hHmM (violet) |

TABLE 4-continued

Finger Pattern Codons of Twelve Major Keys in All Positions for Violin

| MAJOR KEY /POSITION | G, Gb | F#, F | E, Eb | D, Db | C#, C | B, Bb | A, Ab |
|---|---|---|---|---|---|---|---|
| II, IX | ILOh (orange) | OhHm (yellow) | HmMI (green) | MILO (blue) | LOhH (indigo) | hHmM (violet) | mMIL (red) |
| III, X | OhHm (yellow) | HmMI (green) | MILO (blue) | LOhH (indigo) | hHmM (violet) | mMIL (red) | ILOh (orange) |
| IV, XI | HmMI (green) | MILO (blue) | LOhH (indigo) | hHmM (violet) | mMIL (red) | ILOh (orange) | OhHm (yellow) |
| V, XII | MILO (blue) | LOhH (indigo) | hHmM (violet) | mMIL (red) | ILOh (orange) | OhHm (yellow) | HmMI (green) |
| VI | LOhH (indigo) | hHmM (violet) | mMIL (red) | ILOh (orange) | OhHm (yellow) | HmMI (green) | MILO (blue) |
| VII | hHmM (violet) | mMIL (red) | ILOh (orange) | OhHm (yellow) | HmMI (green) | MILO (blue) | LOhH (indigo) |

Table 4 shows that

G III pattern OhHm is the same as E I and the same as A IV, - - -

E III pattern MILO is the same as C I and the same as BVII, - - -

The same for natural minors.

As seen in FIGS. 6 and 7A through 7F, an alternate tool 220 in accordance with the present invention can be used to simulate a guitar fingerboard 222 and includes templates 224, 226, 228, 230, 232, 234, and 236 for identifying finger patterns for various keys in various positions. This tool 220 can be used to help a student visualize finger patterns for a given key and teaches an understanding of the repetitioness of finger patterns as different keys are played.

The Major Key Wheel

Figure 8:
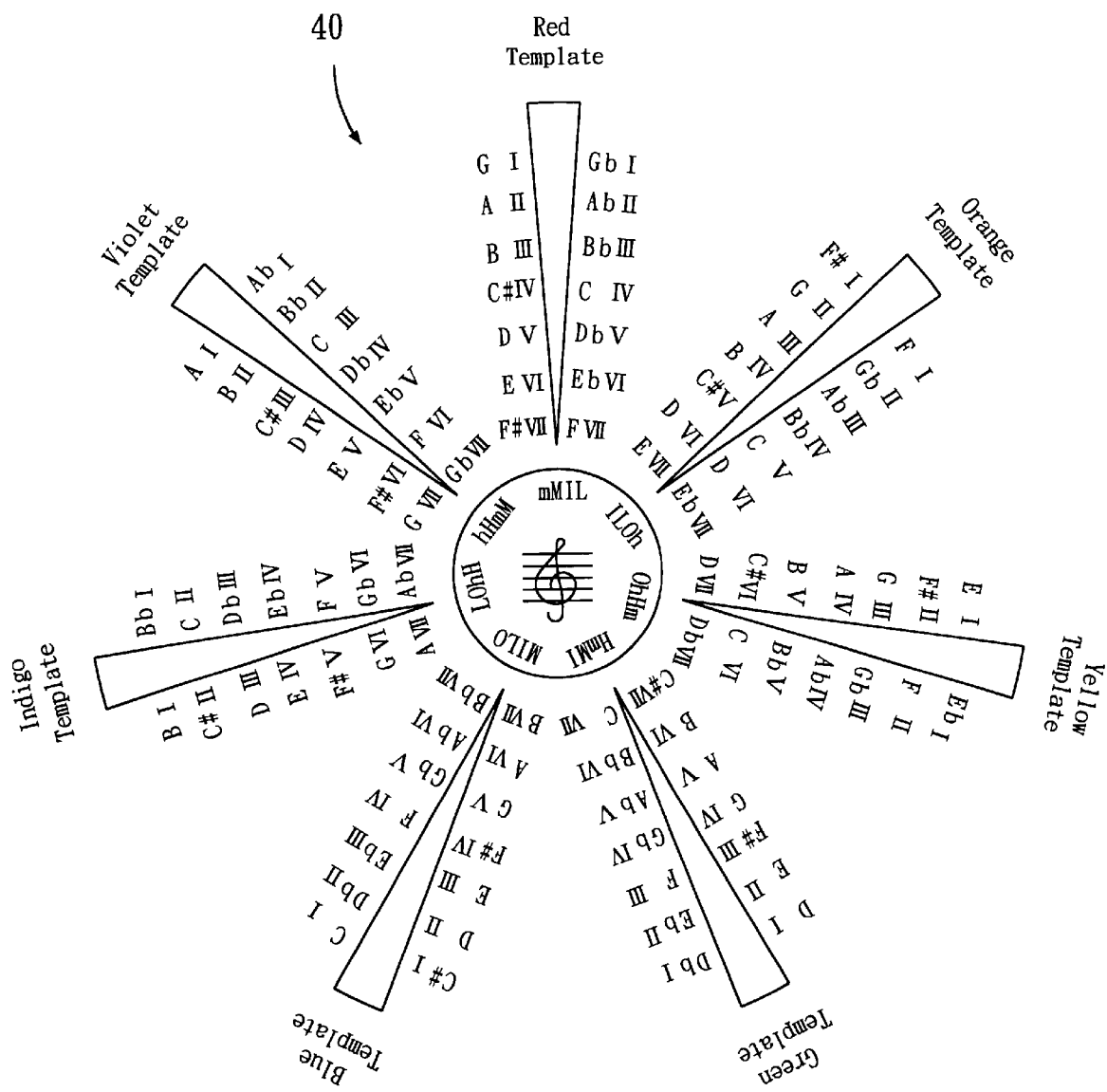
FIG. 8 is a major key wheel for a violin, in accordance with the present invention.

A careful study of Table 4 reveals that those seven finger patterns wear many hats figuratively. It means that one pattern can be used twelve times when keys and positions interplay together. In fact, Table 4 can be transformed into the Major Key Wheel in FIG. 8, which is another embodiment of the present invention for letter learning for strings in accordance with the present invention.

Unlike piano, which has black and white note keys alternating in certain ways, strings are different. In strings, without all the white piano keys to denote C major, there is no need to link flat and sharp major keys through C major and arrange them in a circle five degrees apart, which is the essence of the Key Circle that is well known as the "circle of the fifths" in music theory. Rather, in studying strings, it is better to abide by the chromatic note sequence. In the method of the present invention, the Key Wheel 40 may start with any key, and the progression of position for any key shows the changing of finger pattern clockwise in the rainbow color sequence. The Key Wheel also shows that each finger pattern template can have twelve different uses from combinations of key x in position y, though more than twelve are shown in each bar due to presence of enharmonic keys.

Figure 9:
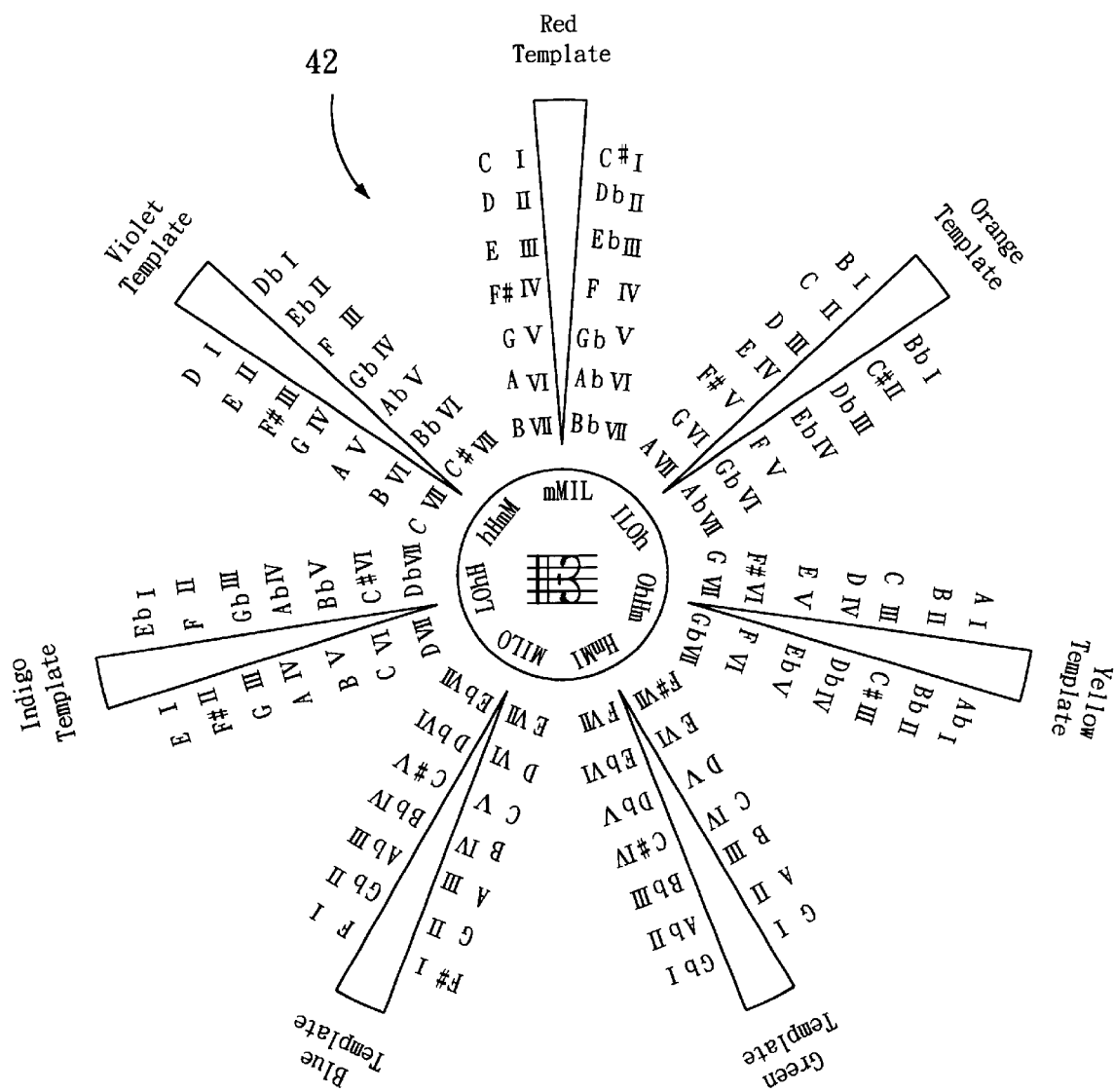
FIG. 9 is a major key wheel for a viola, in accordance with the present invention.
Figure 10:
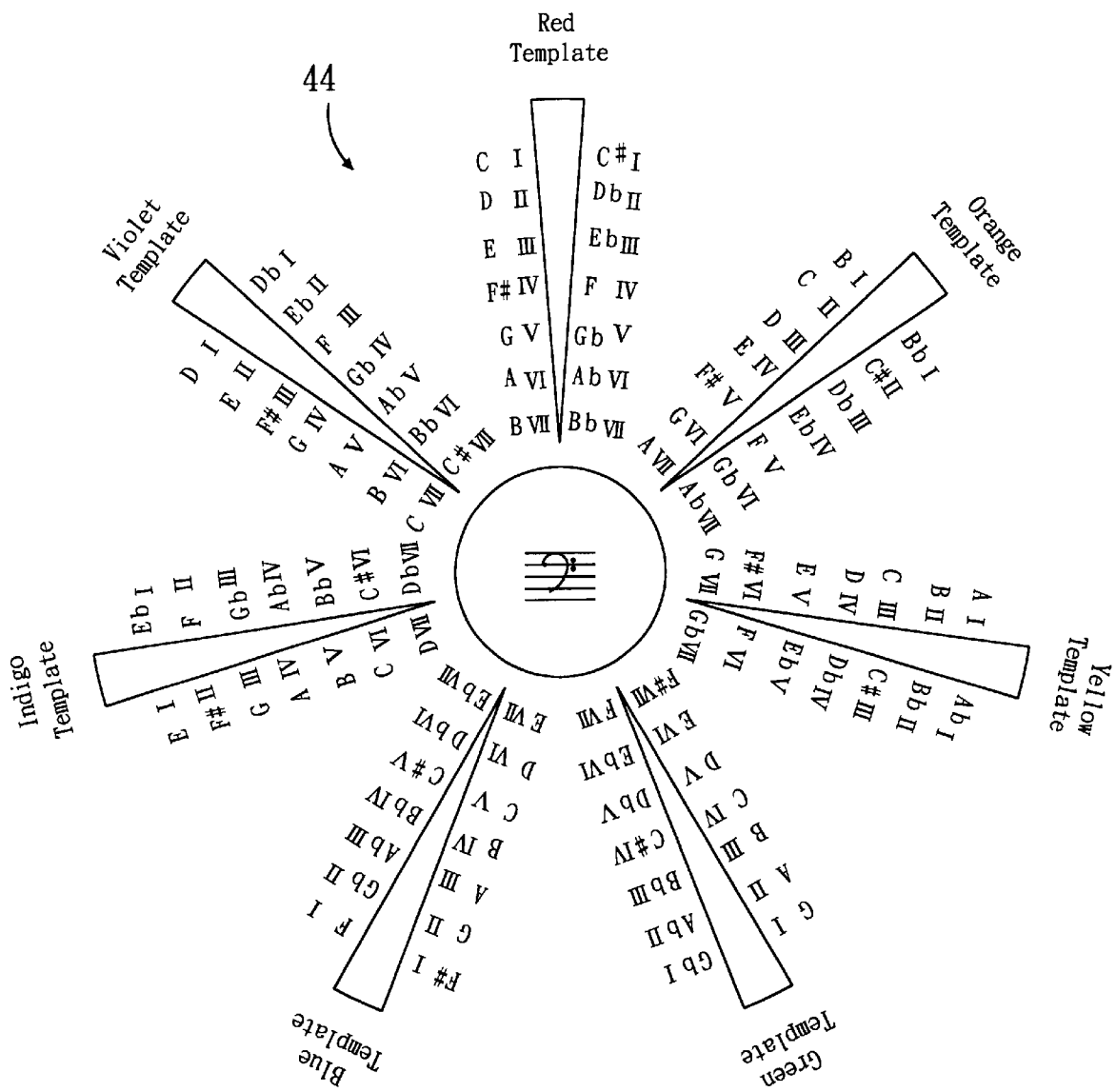
FIG. 10 is a major key wheel for a cello, in accordance with the present invention.
Figure 11:
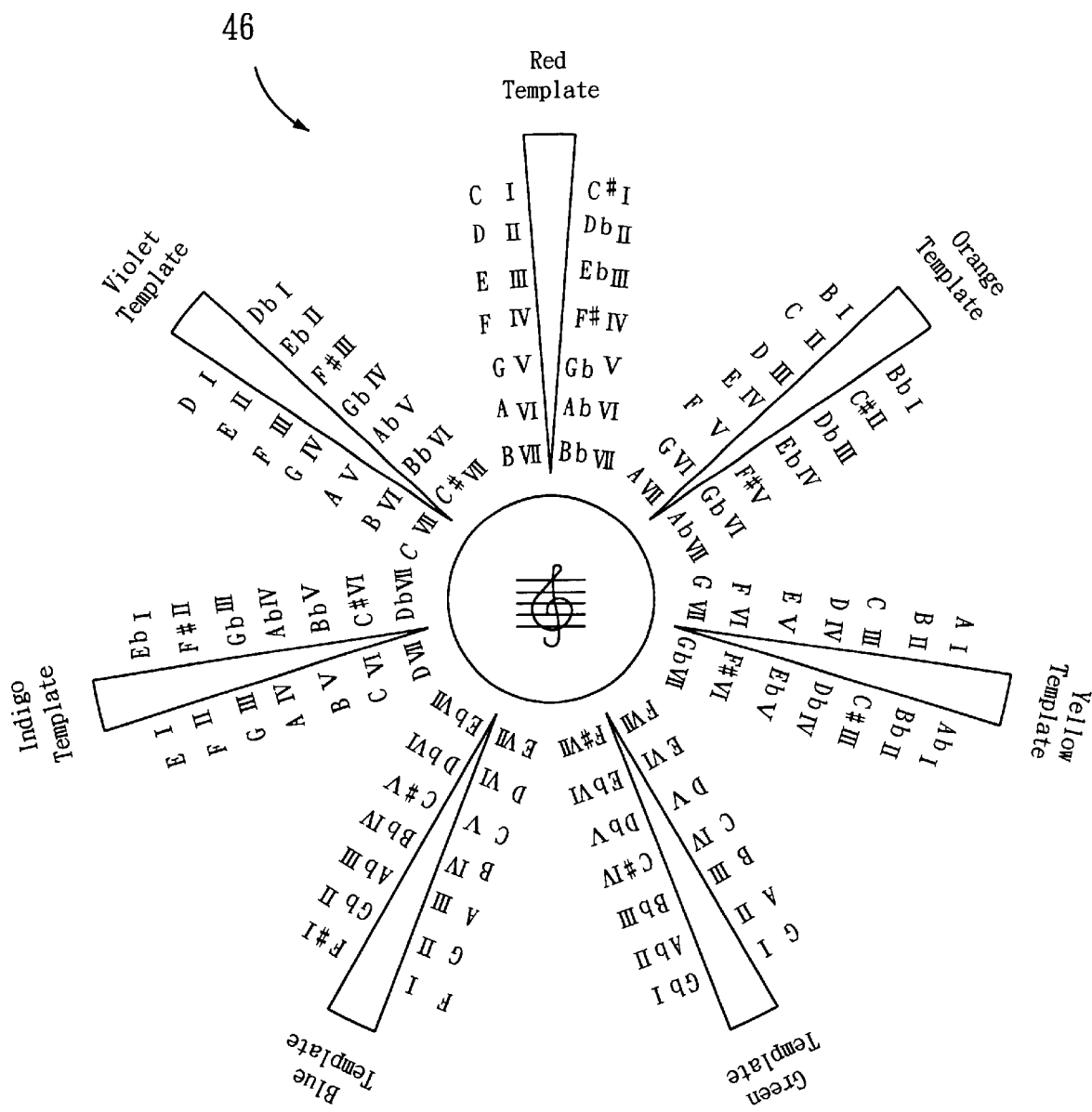
FIG. 11 is a major key wheel for a guitar, in accordance with the present invention.

Similar key wheels can be made for violas, cellos, and guitars as shown in FIGS. 9, 10, and 11, respectively.

It is evident that by using these seven templates, one can easily play out any key in any position. This is the essence of the present invention.

The Movable-Do System in a Scale Board

Figure 13:
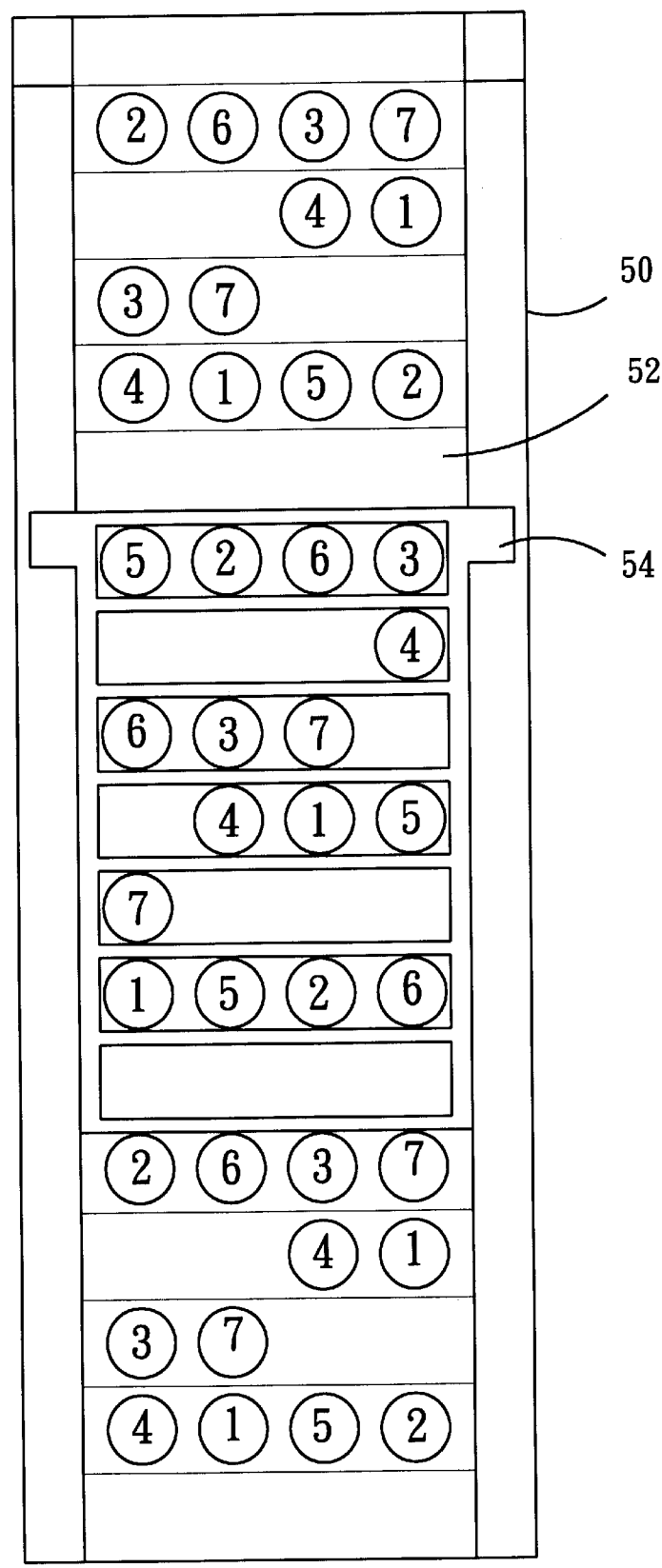
FIG. 13 is the alternate scale board of FIG. 12 with the transparency and ladder frame positioned on the scale board.

Another complementary aspect of the invention is described below. Rather than dealing with a three-way relationship among the key, position, and a finger pattern, it focuses on the finger pattern alone (FIG. 13). By removing the seven note names in a key, yet retaining the basic structure in a major scale, it fundamentally stresses the transition of finger patterns in a succession of positions and their repetitive cyclic nature in every key.

Figure 12:
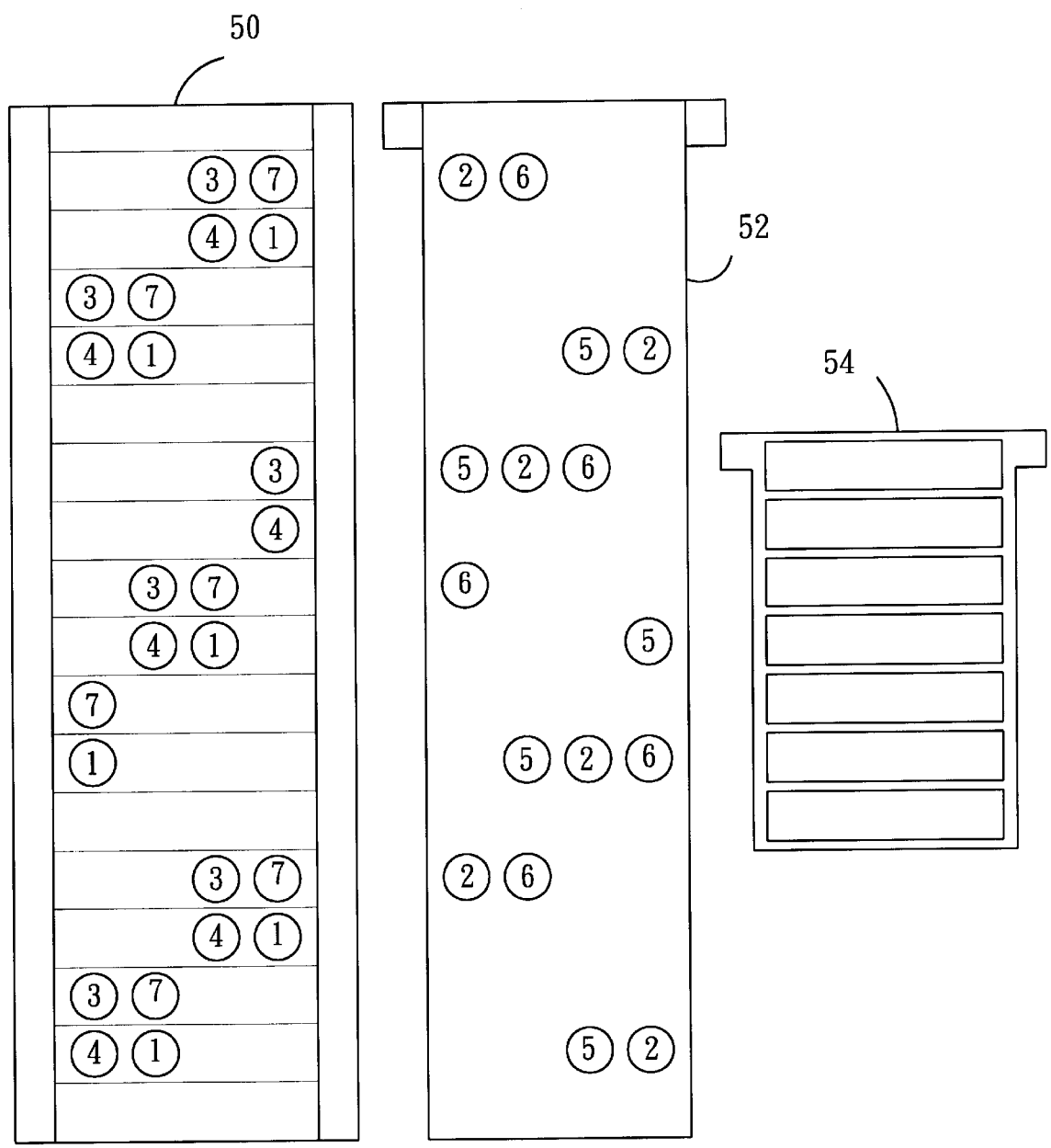
FIG. 12 is a Movable-Do System scale board for a violin, or a viola, or a cello, in accordance with the present invention, including an overlay transparency and a ladder frame.

Since the syllable of the note names are removed, the Fixed-Do system (described before) shown in the twelve major keys is transformed into Movable-Do represented here by the degree numbers one through seven (appeared on the scale board 50 and a super-imposed transparent sheet 52 in FIG. 12). This means, number one can be the tonic of any key when studying the change of finger patterns in a succession of positions. In this method, a ladder template 54 is designed which replaces the seven templates 24 to 36 used in the original tool 20. When placed on the scale board 50, it shows one finger pattern x for an unspecified position in an unspecified key. But when the ladder template 54 moves along the board 50 one numeric note at a time following the numbers on the right edge of the strings, the whole sequence of the finger pattern shows. Thus, this seven-in-one template system invariably becomes the very essence of the whole finger pattern method described herein. It makes learning left-hand-finger-pattern in strings much easier.

Figure 14:
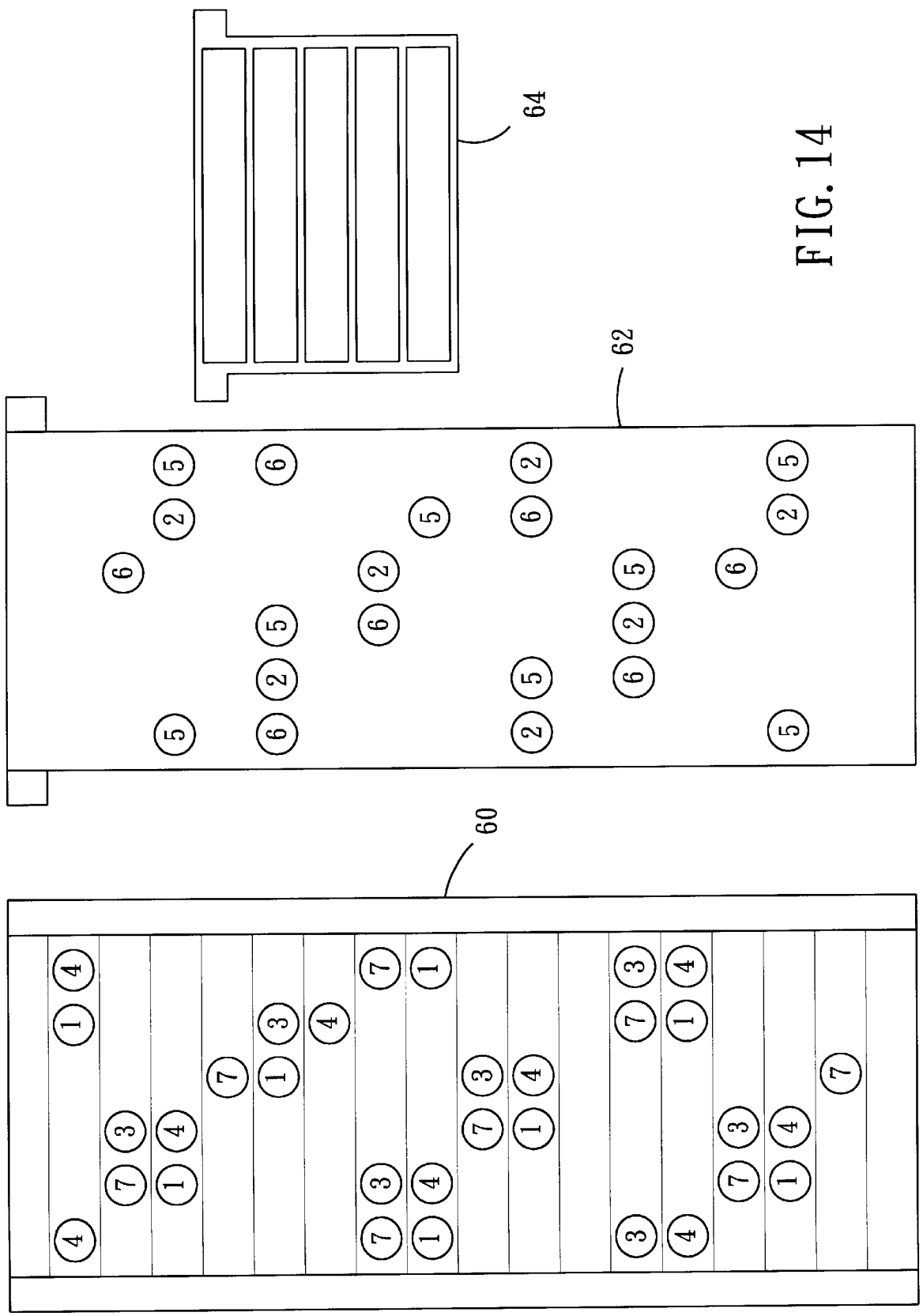
FIG. 14 is the alternate guitar scale board in accordance with the present invention, including an overlay transparency and a ladder frame.
Figure 15:
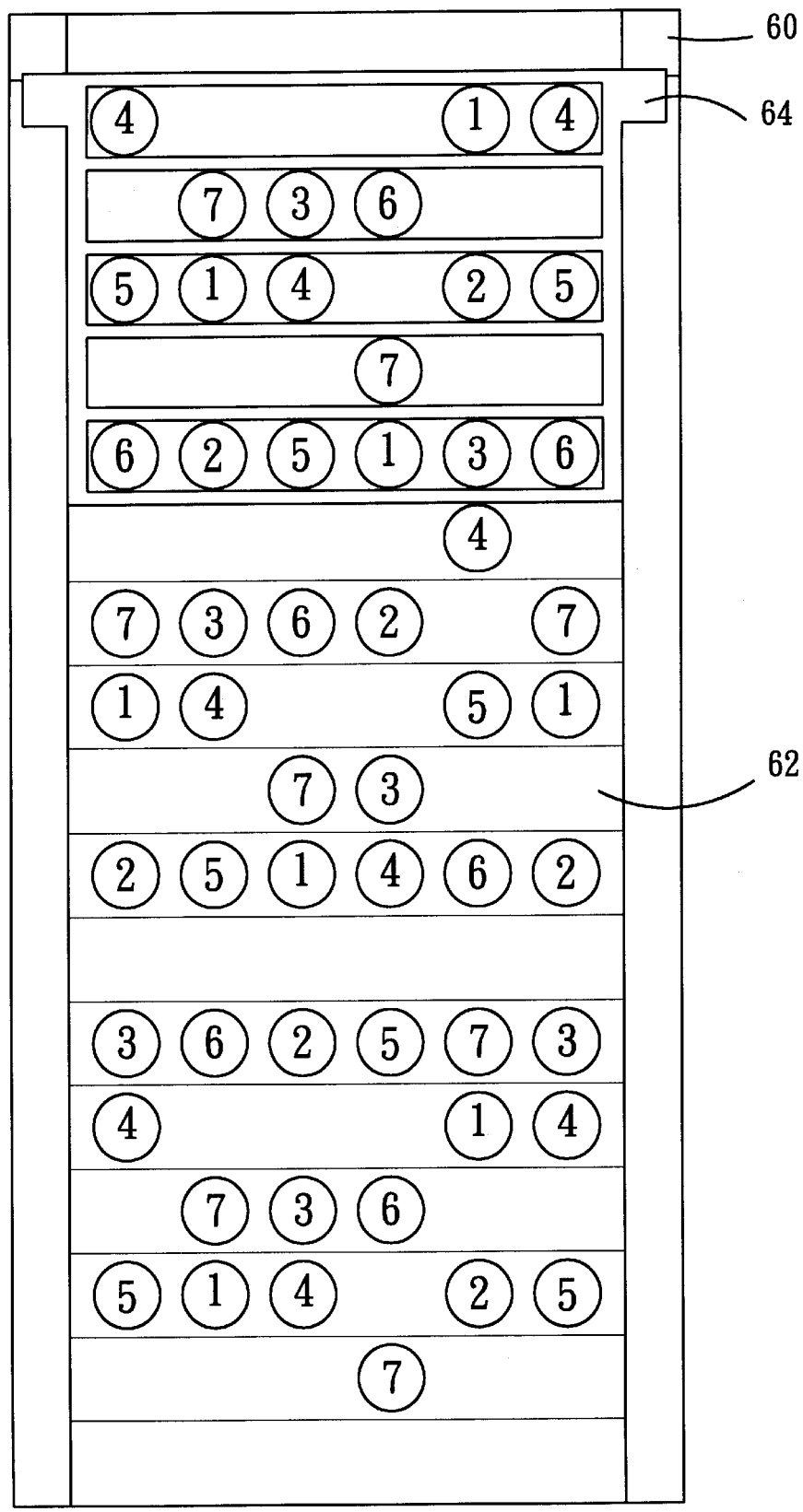
FIG. 15 is the alternate guitar scale board of FIG. 14 with the transparency and ladder frame positioned on the scale board.

This model can be used on violin, viola, and cello without change since all four share four strings, which are tuned at five degrees of notes apart. In the case of a mandolin, it has eight strings but grouped into four. For a guitar, the same method applies but with six strings instead of four (FIGS. 14, 15). This embodiment includes a board 60, a transparent sheet 62, and a ladder template 64.

Lateral and Horizontal Relationships in the Seven Finger Patterns

Because of their repetitive cyclic nature, the seven finger pattern templates are rainbow-color-coded and letter-coded for ease of memorizing. From Table 2, it is learned that each finger pattern template can be used as the first position of two other keys—though some of them are enharmonic. When laid out in a rainbow sequence from $1^{st}$ to $7^{th}$ positions in the major scales (Table 4), one can find some simple rules regarding their lateral and horizontal relationships.

1) Lateral Rules

When left-hand moves along each string longitudinally, i.e., shifting, there is a lateral code pattern emerged repeatedly:

```
            *
            *
            h
            m
            l
            O
            H
            M
            L
            h
            m
            l
            O
            *
            *
      If
            h
            m
            l
               is   a
      and
            O
            H
            M
            L
               is   A
   then, the pattern becomes    *
                                *
                                a
                                A
                                a
                                A
                                *
                                *
```

In fact, the pattern repeats itself for any seven continuous codes in a row.

2) Horizontal Rules

Because strings are tuned in fifths in violin, viola, and cello, there is a fixed relationship for the codes across the strings from string IV on the left to string I on the right (select any four codes in a row to form any finger pattern):

* * * m M l L O h H m M l L O h H m * * * *

By memorizing these orders horizontally, it becomes easy to learn all seven finger patterns in a sequential manner.

But notice that in the Movable-Do system shown by the degrees of note, as in FIG. 13, the horizontal pattern in a complete row (if there are seven strings instead of four) will be:

4 1 5 2 6 3 7

But in the case of four stringed instruments here, there is no note to the left of degree 4, or to the right of degree 7 in any row.

3) Others

Some commonly observed rules also can be easily shown in Table 4, such as:

All finger patterns in any key from $2^{nd}$ position up on both strings G and D are essentially the same as those from the $1^{st}$ position up on strings A and E.

In any key, the finger patterns of strings G, D, and A from $5^{th}$ position up are exactly the same as those from strings D, A, and E from the $1^{st}$ position up.

Tonic and the Four-Note-Cluster

When two pairs of half step—$3^{rd}$ & $4^{th}$, and $7^{th}$ & $1^{st}$—appear side by side on adjacent strings in an octave as in hH, mM, and lL (FIG. 13), they form a four-note-cluster, in which the note on the lower right quadrant is the tonic for the major key in the case of violin, viola, and cello. For guitar, the tonic is on the lower left quadrant (FIG. 15).

Tonic can also be found in:

| | |
|---|---|
| Code H | played by the $4^{th}$ finger |
| Code M | played by the $3^{rd}$ finger |
| Code L | played by the $2^{nd}$ finger |
| Code h | played by the $1^{st}$ finger |

Tonic Blocks as Puzzle for Learning Finger Patterns

A second four-note-cluster comprises note degrees—the $1^{st}$, the $2^{nd}$, the $5^{th}$, and the $6^{th}$. Together, these two four-note-clusters can be looked upon as one square block and one rectangular block linked through the tonic:

| | | |
|---|---|---|
| 3 | 7 | |
| 4 | 1 | 5 |
| | 2 | 6 |

Figure 16:
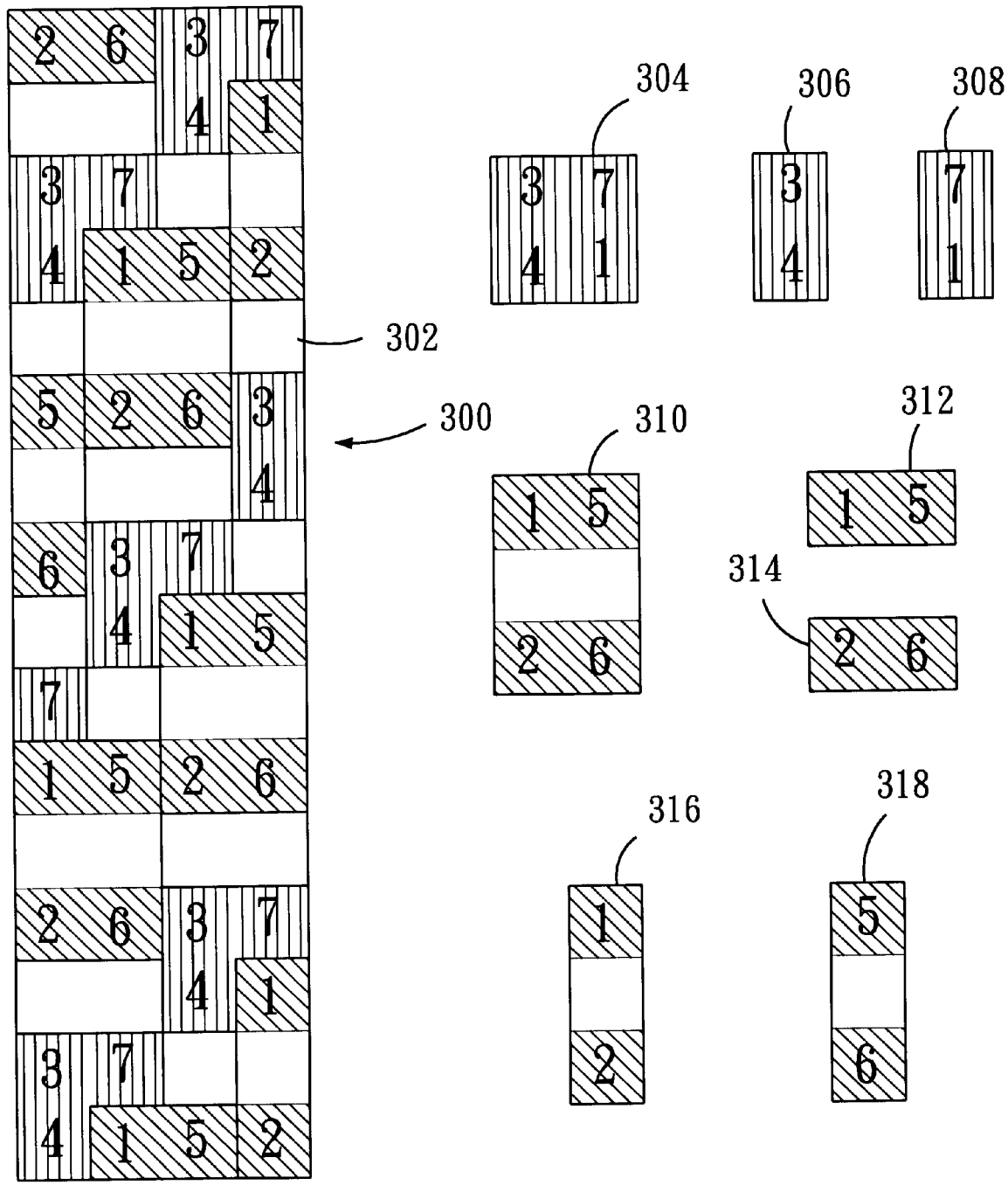
FIG. 16 is a tonic block puzzle for learning finger patterns on a violin, viola, or cello.
Figure 17:
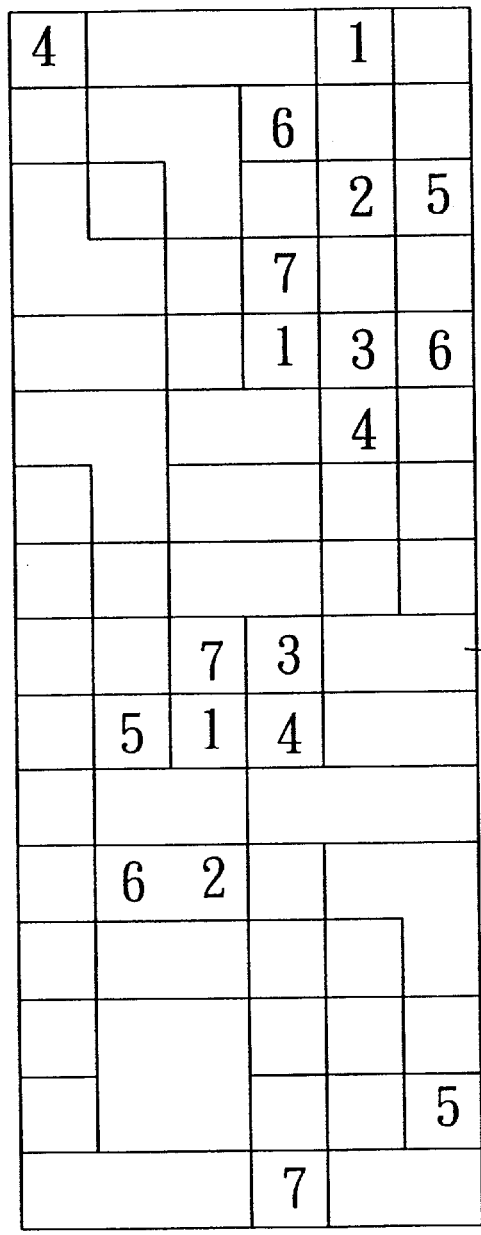
FIG. 17 is a tonic black puzzle for learning finger patterns on a guitar.
Figure 17:
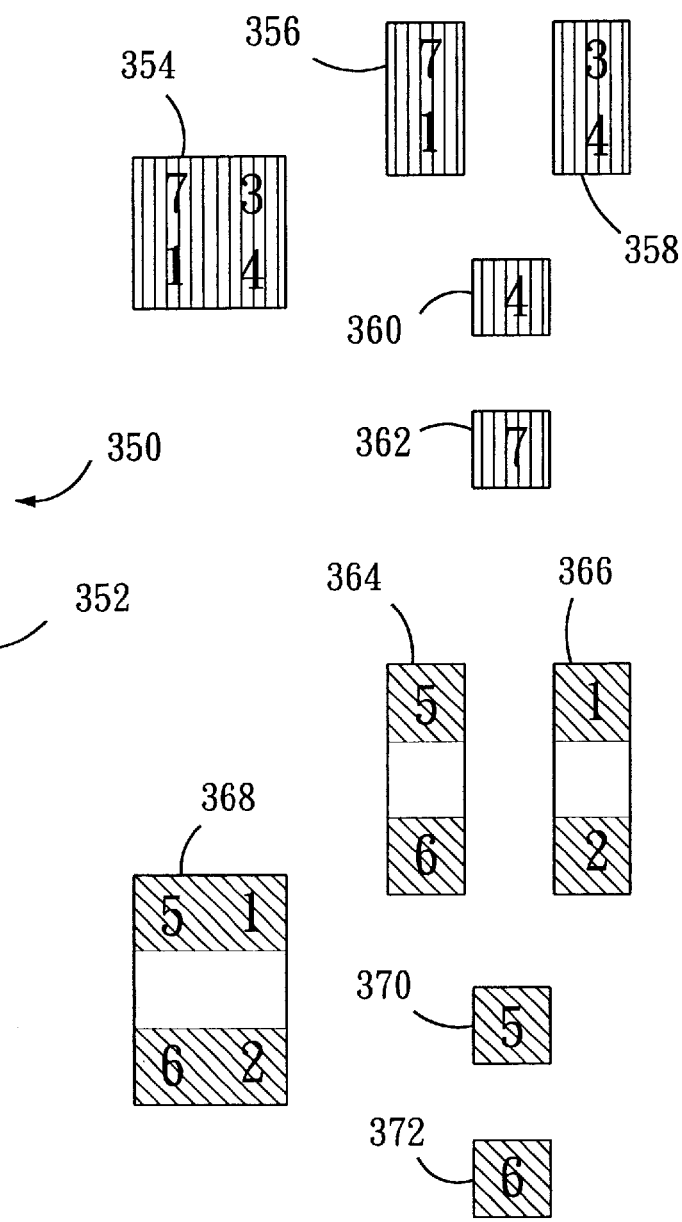
Figure 18:
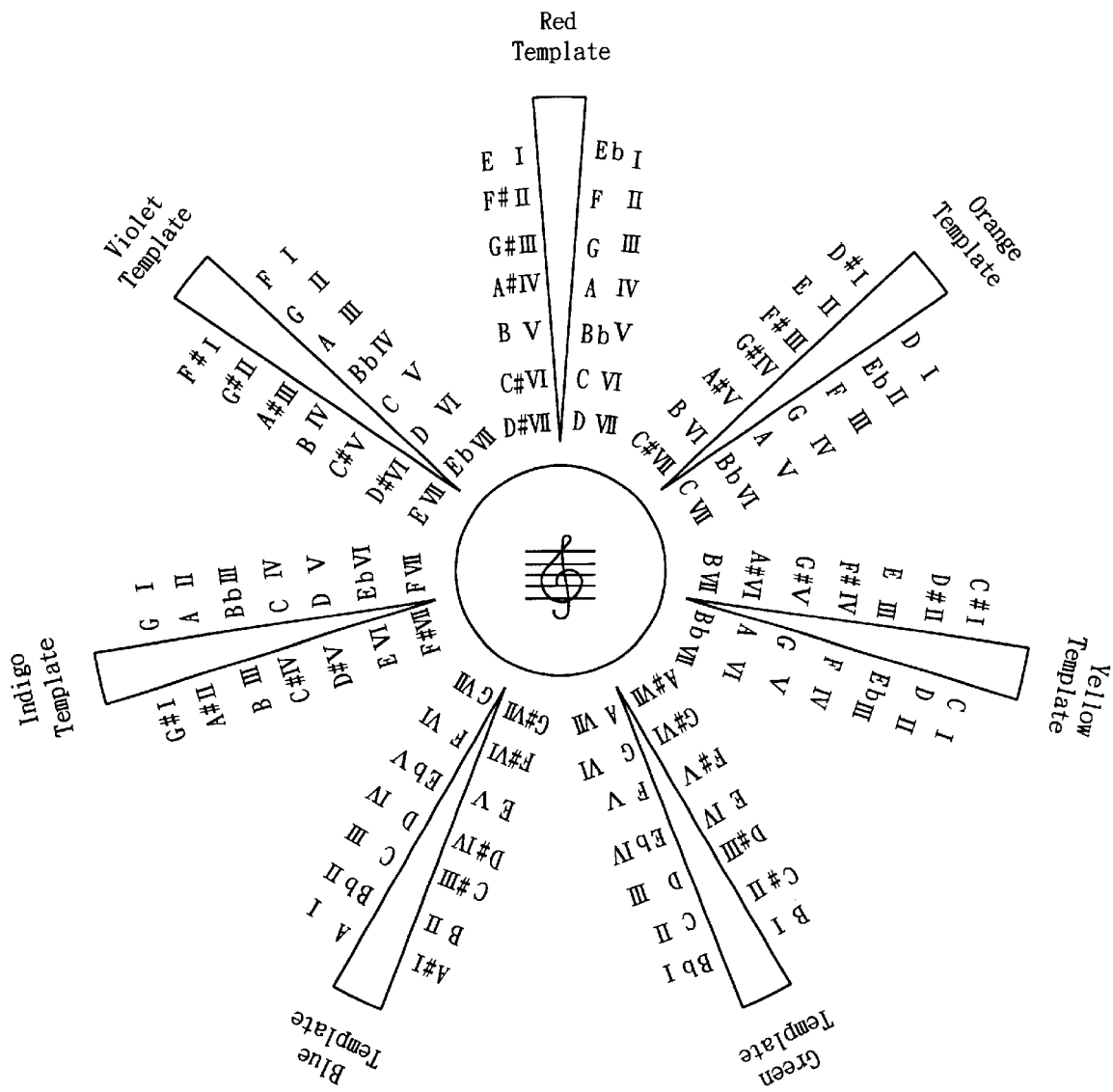
FIG. 18 is a major key wheel in accordance with the invention.
Figure 19:
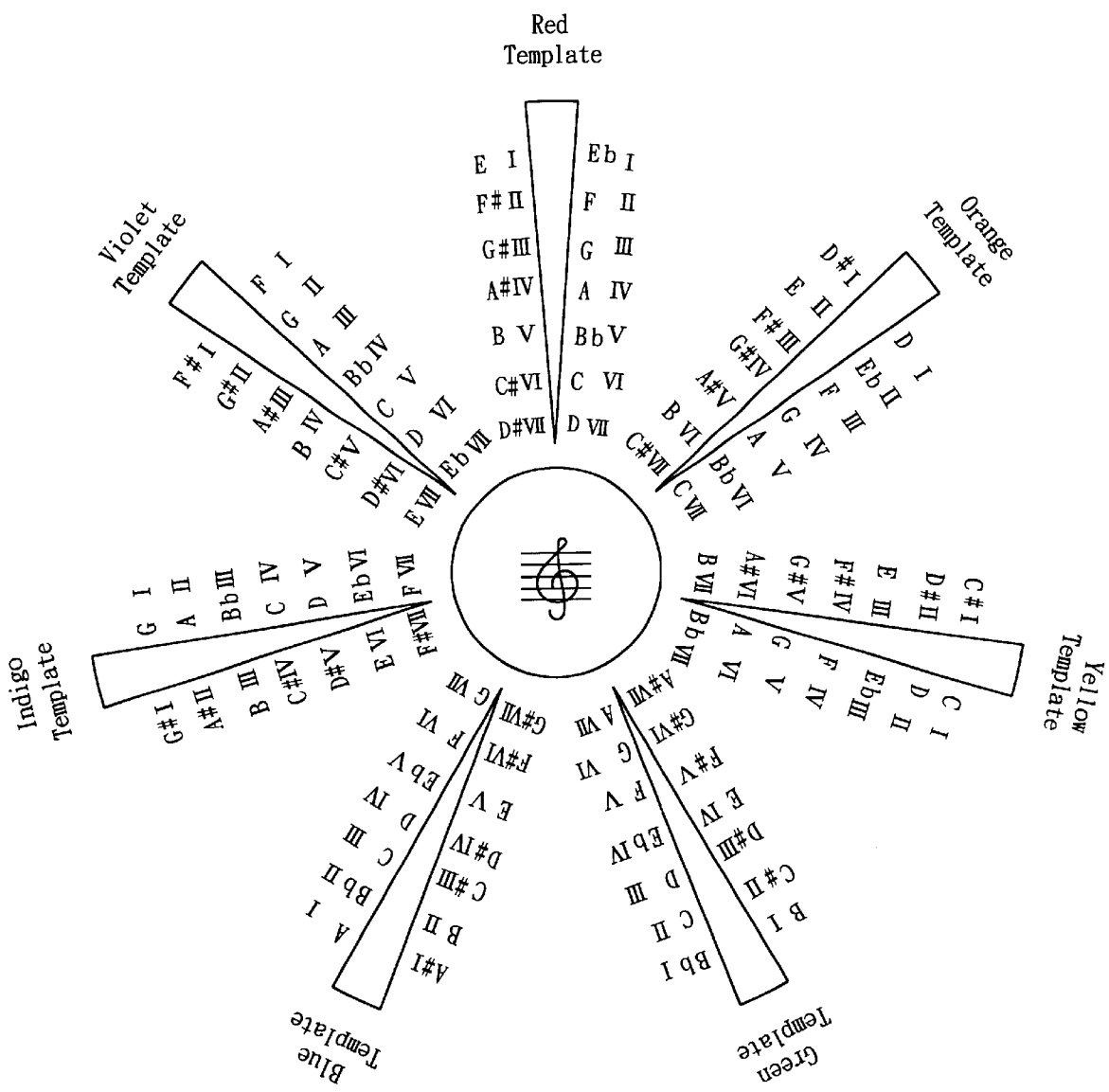
FIG. 19 is a minor key wheel in accordance with the invention.

The whole finger patterns thus can be learned in yet another simplified way through puzzles as shown in FIGS. 16 and 17. FIG. 16 addresses violin, viola, and cello. FIG. 17 is a puzzle for use with guitar.

A puzzle 300 for violin, viola, and cello can include a board 302 and puzzle pieces 304, 306, 308, 310, 312, 314, 316, and 318. Only eight puzzle pieces are illustrated, but it should be recognized that more pieces can be used. A student completes the puzzle by placing the tonic blocks 304 to 318 in proper order. Coloring for the blocks may be used to enhance the play value of the puzzle 300. The colors are random to add a degree of difficulty to the puzzle, or the colors can be specific to particular tonic blocks to aid younger students trying to solve the puzzle 300. The puzzle pieces can be applied using any suitable releasable connector such as magnets, recesses, velcro, and others.

A similar puzzle 350 can be created for the guitar (see FIG. 17). This puzzle 350 includes a board 352, and a number of sample puzzle pieces 354, 356, 358, 360, 362, 364, 366, 368, 370, and 372. As stated above, more puzzle pieces can be used. This puzzle 350 can be completed in a manner similar to puzzle 300.

Suggestions for Learning

Since the Key Wheel 40 is cyclic, one may start a lesson from any key, but it is most logical to:

a) learn in terms of pattern;
   b) start from first position, then second, third, etc.; and
   c) select most commonly played keys first.

Having these in mind, the best way to learn and use the present invention would be:

a) start with first positions of G major red template, D major green template, and C major blue template;
   b) next learn both G major and C major second positions, that is, orange template for G major and indigo template for C major; and
   c) after completing third positions of G major yellow template and C major violet template, one has already learned all the seven finger patterns. Now it's time to study any key in any position.

In addition, the use of the Movable-Do scale board along with fingerboard tool will not only teach a student the basic structure in a scale but also greatly enhance his ability to grasp the concept of finger patterns in continuity.

For Viola

For viola, a grand C major scale chart with open strings C, G, D, and A baseboard (FIG. 5A) in seven positions is served as its master key just as G major does in violin. The grand C major scale for viola also starts with red template mMlL as its 1st position finger pattern. The rainbow color sequence followed is the same as that in violin finger patterns.

Like Tables 2 and 3 in violin, Tables 5 and 6 also show first position codons for each major and natural minor key in viola.

TABLE 5

First Position Finger Pattern Codons For Twelve Major Keys In Viola

| MAJOR KEY/ POSITION | FINGER PATTERN CONDON/COLOR | | MAJOR KEY/POSITION |
|---|---|---|---|
| C I | mMlL | Red | *C# I |
| | | | C I (half position lower than C# I) |
| C II | lLOh | Orange | *B I |
| | | | Bb I (half position lower than B I) |
| C III | OhHm | Yellow | A I |
| | | | Ab I (half position lower than A I) |
| C IV | HmMl | Green | G I |
| | | | *Gb I (half position lower than G I) |
| C V | MlLO | Blue | *F# I |
| | | | F I (half position lower than F# I) |

TABLE 5-continued

First Position Finger Pattern Codons For Twelve Major Keys In Viola

| MAJOR KEY/ POSITION | FINGER PATTERN CONDON/COLOR | | MAJOR KEY/POSITION |
|---|---|---|---|
| C VI | LOhH | Indigo | E I |
| | | | Eb I (half position lower than E I) |
| C VII | hHmM | Violet | D I |
| | | | *Db I (half position lower than D I) |

* Enharmonic Keys:
  F# major (6 sharps)=Gb major (6 flats)
  C# major (7 sharps)=Db major (5 flats)
  B major (5 sharps)=Cb major (7 flats)

TABLE 6

First Position Finger Pattern Codons for Twelve Natural Minor Keys in Viola

| NATURAL MINOR KEY/ POSITION | FINGER PATTERN CODON/COLOR | | NATURAL MINOR KEY/POSITION |
|---|---|---|---|
| A I | mMlL | Red | *A# I |
| | | | A I (half position lower than A# I) |
| A II | lLOh | Orange | *G# I |
| | | | G I (half position lower than G# I) |
| A III | OhHm | Yellow | F# I |
| | | | F I (half position lower than F# I) |
| A IV | HmMl | Green | E I |
| | | | *Eb I (half position lower than E I) |
| A V | MlLO | Blue | *D# I |
| | | | D I (half position lower than D# I) |
| A VI | LOhH | Indigo | C# I |
| | | | C I (half position lower than C# I) |
| A VII | hHmM | Violet | B I |
| | | | *Bb I (half position lower than B I) |

* Enharmonic Keys:
  D# minor (6 sharps)=Eb minor (6 flats)
  A# minor (7 sharps)=Bb minor (5 flats)
  G# minor (5 sharps)=Ab minor (7 flats)

Similarly derived from Table 5, Table 7 also shows finger pattern codons of twelve major keys for all positions in viola.

TABLE 7

Finger Pattern Codons of Twelve Major Keys in All Positions for Viola

| MAJOR KEY/ POSITION | C#, C | B, Bb | A, Ab | G, Gb | F#, F | E, Eb | D, Db |
|---|---|---|---|---|---|---|---|
| I, VIII | mMlL (red) | lLOh (orange) | OhHm (yellow) | HmMl (green) | MlLO (blue) | LOhH (indigo) | hHmM (violet) |
| II, IX | lLOh (orange) | OhHm (yellow) | HmMl (green) | MlLO (blue) | LOhH (indigo) | hHmM (violet) | mMlL (red) |
| III, X | OhHm (yellow) | HmMl (green) | MlLO (blue) | LOhH (indigo) | hHmM (violet) | mMlL (red) | lLOh (orange) |
| IV, XI | HmMl (green) | MlLO (blue) | LOhH (indigo) | hHmM (violet) | mMlL (red) | lLOh (orange) | OhHm (yellow) |
| V, XII | MlLO (blue) | LOhH (indigo) | hHmM (violet) | mMlL (red) | lLOh (orange) | OhHm (yellow) | HmMl (green) |
| VI | LOhH (indigo) | hHmM (violet) | mMlL (red) | lLOh (orange) | OhHm (yellow) | HmMl (green) | MlLO (blue) |
| VII | hHmM (violet) | mMlL (red) | lLOh (orange) | OhHm (yellow) | HmMl (green) | MlLO (blue) | LOhH (indigo) |

For Cello & Bass

Cello is an octave lower than viola and with extended positions (FIG. 5A). Bass is not only tuned at perfect fourth apart but also has half and first positions. These are all different from violin but the basic principles of the present invention still apply.

Conclusion

To learn the present inventive method for stringed instruments is to learn left-hand finger patterns for strings by exploring three way relationships among: 1) twelve major keys or their relative natural minors, 2) seven positions, and 3) seven finger patterns. This can be summarized as follows:

1) Left-hand finger patterns in strings for every key in every position—a total of 84 possibilities—can be organized into seven groups and systemically studied in an easy way for beginning and intermediate students (see example of violin in FIG. 2).

2) These seven finger patterns are coded with letters h, m, l, O, H, M, and L, which denote:

h as half step (the 3$^{rd}$ and 4$^{th}$ degrees of note in a major scale) to be played by the 3$^{rd}$ and 4$^{th}$ fingers, the rests are whole steps in a tetrachord.

m as half step (the 3$^{rd}$ and 4$^{th}$ degrees of note in a major scale) to be played by the 2$^{nd}$ and 3$^{rd}$ fingers, the rests are whole steps in a tetrachord.

l as half step (the 3$^{rd}$ and 4$^{th}$ degrees of note in a major scale) to be played by the 1$^{st}$ and 2$^{nd}$ fingers, the rests are whole steps in a tetrachord.

O as all four fingers are spread out with whole steps (degrees of note 4$^{th}$, 5$^{th}$, 6$^{th}$, and 7$^{th}$ in a major scale) in between in a tetrachord.

H as half step (the 7$^{th}$ and upper tonic notes in a major scale) to be played by the 3$^{rd}$ and 4$^{th}$ fingers, the rests are whole steps in a tetrachord.

M as half step (the 7$^{th}$ and upper tonic notes in a major scale) to be played by the 2$^{nd}$ and 3$^{rd}$ fingers, the rests are whole steps in a tetrachord.

L as half step (the 7$^{th}$ and upper tonic notes in a major scale) to be played by the 1$^{st}$ and 2$^{nd}$ fingers, the rests are whole steps in a tetrachord.

Four letters are required to code for each pattern (a template). The total of seven four-letter-code-words, or codon: mMlL, lLOh, OhHm, HmMl, MlLO, LOhH, and hHmM are also color-coded in a rainbow sequence as red, orange, yellow, green, blue, indigo, and violet respectively.

1) A grand G major scale covering positions from the 1$^{st}$ to the 7$^{th}$ can be shown through the use of these seven templates arranged in a rainbow color sequence starting with the red. For the rest of twelve major keys, their first positions can be easily found by using one of the templates from colors: orange, yellow, green, blue, indigo, and violet. Subsequently, the next finger patterns to be used for each key are followed by the rainbow color sequence of their chosen template in the first position.

2) A key wheel shows that within seven finger pattern templates each can have twelve different uses for key x in position y, and that the succeeding finger patterns in each key when positions add up follow the wheel's rainbow-color sequence clockwise.

3) A complementary tool for studying finger patterns is designed by using a scale board according to the grand G major scale finger patterns. This method uses Movable-Do System in numeric note degrees of one to seven. A ladder template placed on the board shows finger pattern in scale of one key in one position at a time—it can be any key in its specific position. For example, the first one shown is the red template that can be the finger pattern of G major 1$^{st}$ position; the second one shown is the orange template and can be the finger pattern of F major 1$^{st}$ position, etc. The continuous moving of this seven-in-one template, therefore, shows through a gamut of its potential use.

4) The rules guiding the placement of codes in any finger pattern can be summarized as follows:

a) Lateral Rules

When shifting on any one string, code letter changes invariably following this sequence and in a repetitive way:

```
*
h
m
l
O
H
M
L
h
m
l
*
``` b) Horizontal Rules

There is also a fixed relationship in the letter codes across the strings. For strings tuned in fifths, the sequence for any code in one position horizontally is:

\*\*\* m M l L O h H m M l L O h H m \*\*\*

For note degrees in the Movable-Do System, the sequence across the strings on any one row is:

\*\*\* 4 1 5 2 6 3 7 \*\*\*

But there is no note to the left of degree number 4, and no note to the right of degree number 7 on any one row.

6) Tonic can be easily found on the lower right quadrant of any four-note-cluster (double half-step pairs) for the four-stringed instruments like violin, viola, and cello, and on the lower left quadrant of any four-note-cluster for guitar.

Tonic can also be found in:

| | |
|---|---|
| Code H | played by the 4$^{th}$ finger |
| Code M | played by the 3$^{rd}$ finger |
| Code L | played by the 2$^{nd}$ finger |
| Code h | played by the 1$^{st}$ finger |

7) The whole finger patterns in sequence in a scale board can be viewed as puzzles made up by two different kinds of blocks and their parts linked by the tonic—one is a double half-step pair from note degrees 3$^{rd}$, 4$^{th}$, 7$^{th}$, and 1$^{st}$, and the other is a rectangular cluster of four note degrees: 1$^{st}$, 2$^{nd}$, 5$^{th}$, and 6$^{th}$.

| | | |
|---|---|---|
| 3 | 7 | |
| 4 | 1 | 5 |
| | 2 | 6 |

8) The suggestions for learning the present method are based on studying the seven finger pattern templates selectively (FIGS. 2A to 2H). Learn first the positions of G major red template, D major green template, and C major blue template. Then study the orange template for G II and indigo for C II. After completing the third position yellow template for G major and violet for C major, one has become familiar with all the finger patterns and is ready to play any key in any position.

9) For viola, the basic method is the same only that a viola is a fifth interval lower than violin. So, instead of using G major master templates, C major is substituted with the same mMlL red template as its first pattern for its first position. Accordingly, one should change the baseboard to C, G, D, and A as open strings for viola.

10) Cello and bass both have varied positions compared to violin and viola. But the basics of the present invention are the same.

It is of vital importance in string playing to have a clear mental picture of every note displayed on a fingerboard. The present inventive apparatus and methods provide a clear mental picture of the notes on a fingerboard in addition to providing an efficient way of learning finger patterns and positions for all major and natural minor keys. By recognizing the nature of major scale and the way strings are arranged and tuned, it has transformed a seemingly complex study of left-hand finger pattern and position into a practicable one, yet it is interesting and methodically challenging. There is an inherent simplicity, beauty, and unity in the core of learning finger pattern in this way. With perseverance, learning left-hand finger patterns and positions with a great deal of efficacy can be easy and fun.

Although the description herein addresses one way of using the tool 20 of the present invention, music teachers and students will use it in a variety of ways to help learning.

The following is a general guideline of how to use the seven templates for violin:

1) Arrange any number of the templates 24 to 36 on the board 22, from top to bottom, in any position, and in sequence according to a rainbow-colored wheel from red to violet to red.
2) Each finger pattern template has twelve different uses; each use represents that finger pattern in key x and position y. Thus a total of 84 possibilities exist from 7 finger patterns times 12.
3) From the $8^{th}$ position up, the patterns simply repeat themselves from the first one.
4) Since major and minor keys are paired and share the same key signature, all 84 possibilities of natural minor key x in position y can also be played.
5) Each template is labeled for two key names to denote its major key when placed in the first position—although some are enharmonic. When two major keys share the same template, the use of the right hand key is to be placed one chromatic note lower than the use of the left one.
6) The tonic note of any major key can be recognized in a glance by looking at the lower right quadrant of any x-y-plane-shaped, four-note-cluster on any template (for violin, viola, and cello), and lower left quadrant for guitar.
7) The letter coding system for the seven finger patterns: mMlL, lLOh, OhHm, HmMl, MlLO, LOhH, and hHmM should be memorized in sequence and as the first position finger patterns of their specific major keys.

Reference

Baillot, Pierre Marie Francois de Sales. 1835. Edited and translated by Goldberg, Louise. 1991. The art of the violin. Northwestern University Press. Evanston, Ill.

Flesch, Carl. 1939 second ed. The art of violin playing. New York Carl Fischer. N.Y.

Gerle, Robert. 1983. The art of practicing the violin. Stainer & Bell, London.

What is claimed is:

1. Apparatus for displaying finger patterns of a stringed instrument having a fingerboard, the apparatus comprising:

a baseboard having thereon a pattern of chromatic notes, each note positioned in the same relative position as it appears on the fingerboard of the stringed instrument; and a plurality of templates for placement over the baseboard, each template corresponding to at least one particular key in a particular position and defining a plurality of holes through which notes corresponding to the particular key are visible;

a base having thereon a plurality of color-coded bars extending radially outward from a center of the base, each bar corresponds to a finger pattern of the stringed instrument and the arrangement of the bars corresponds to the cyclic nature of finger patterns on the fingerboard of the stringed instrument; and a plurality of key signatures with positions adjacent to each bar.

2. The apparatus of claim 1, wherein each template can be releasably secured to the baseboard to represent twelve different major and minor keys in more than seven different positions.

3. The apparatus of claim 1, wherein all of the templates can be simultaneously and releasably secured to the baseboard.

4. The apparatus of claim 1, wherein the templates are color-coded.

5. The apparatus of claim 1, wherein the templates are color-coded in a pre-determined pattern.

6. The apparatus of claim 1, wherein the templates are color-coded in a sequence corresponding to at least a partial spectrum of a rainbow.

7. The apparatus of claim 1, wherein each bar corresponds to a finger pattern codon.

8. The apparatus of claim 7, wherein each finger pattern codon is a combination of four letters, and corresponding to a finger pattern to be used to play notes for twelve major keys in their corresponding positions.

9. Apparatus for displaying finger patterns of a stringed instrument having a fingerboard, the apparatus comprising:

a baseboard having thereon a pattern of chromatic notes, each note positioned in the same relative position as it appears on the fingerboard of the stringed instrument;

a plurality of templates for placement over the baseboard, each template corresponding to at least one particular key in a particular position and defining a plurality of holes through which notes corresponding to the particular key are visible;

a base having thereon a plurality of color-coded bars extending radially outward from a center of the base, each bar corresponds to a finger pattern of the stringed instrument and the arrangement of the bars corresponds to the cyclic nature of finger patterns on the fingerboard of the stringed instrument; and a plurality of key signatures with positions adjacent to each bar, wherein each bar corresponds to a finger pattern codon comprising a combination of four letters, and corresponding to a finger pattern used to play notes for twelve major and minor keys in their corresponding positions, wherein four of the letters are taken from a set of seven letters h, m, l, O, H, M, L, and wherein:

h as half step (the $3^{rd}$ and $4^{th}$ degrees of note in a major scale) to be played by the $3^{rd}$ and $4^{th}$ fingers, the rests are whole steps in a tetrachord;

m as half step (the $3^{rd}$ and $4^{th}$ degrees of note in a major scale) to be played by the $2^{nd}$ and $3^{rd}$ fingers, the rests are whole steps in a tetrachord;

l as half step (the 3$^{rd}$ and 4$^{th}$ degrees of note in a major scale) to be played by the 1$^{st}$ and 2$^{nd}$ fingers, the rests are whole steps in a tetrachord;

O as all four fingers are spread out with whole steps (degrees of note 4$^{th}$, 5$^{th}$, 6$^{th}$ and 7$^{th}$ in a major scale) in between a tetrachord;

H as half step (the 7$^{th}$ and upper tonic notes in a major scale) to be played by the 3$^{rd}$ and 4$^{th}$ fingers, the rests are whole steps in a tetrachord;

M as half step (the 7$^{th}$ and upper tonic notes in a major scale) to be played by the 2$^{nd}$ and 3$^{rd}$ fingers, the rests are whole steps in a tetrachord; and L as half step (the 7$^{th}$ and upper tonic notes in a major scale) to be played by the 1$^{st}$ and 2$^{nd}$ fingers, the rests are whole steps in a tetrachord.

* * * * *